(12) United States Patent
Isenhour et al.

(10) Patent No.: US 8,950,949 B2
(45) Date of Patent: Feb. 10, 2015

(54) CIRCUIT BOARD(S) EMPLOYING OPTICAL INTERFACES OPTICALLY CONNECTED TO SURFACE-ACCESSIBLE, PLANAR-SHAPED, INTER-BOARD OPTICAL FIBER TRACES, AND RELATED CONNECTORS, ASSEMBLIES, AND METHODS

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/802,949

(22) Filed: Mar. 14, 2013

(65) Prior Publication Data

US 2014/0270626 A1    Sep. 18, 2014

(51) Int. Cl.

| | |
|---|---|
| *G02B 6/44* | (2006.01) |
| *G02B 6/122* | (2006.01) |
| *G02B 6/124* | (2006.01) |
| *G02B 6/13* | (2006.01) |
| *G02B 6/30* | (2006.01) |
| *G02B 6/43* | (2006.01) |
| G02B 6/32 | (2006.01) |
| G02B 6/38 | (2006.01) |
| G02B 6/42 | (2006.01) |

(52) U.S. Cl.
CPC ............... *G02B 6/122* (2013.01); *G02B 6/124* (2013.01); *G02B 6/13* (2013.01); *G02B 6/30* (2013.01); *G02B 6/43* (2013.01); G02B 6/32 (2013.01); G02B 6/3885 (2013.01); G02B 6/4214 (2013.01)
USPC .............................................. 385/89; 385/60

(58) Field of Classification Search
USPC ...................................................... 385/89, 60
See application file for complete search history.

(56) References Cited

U.S. PATENT DOCUMENTS

| 5,719,978 A * | 2/1998 | Kakii et al. ...................... 385/89 |
|---|---|---|
| 2005/0163431 A1 | 7/2005 | Moynihan et al. .............. 385/60 |
| 2005/0220401 A1 | 10/2005 | Jiang et al. ....................... 385/28 |
| 2009/0052904 A2 | 2/2009 | Pitwon et al. ................. 398/139 |
| 2011/0158585 A1 | 6/2011 | Chang et al. .................... 385/33 |

FOREIGN PATENT DOCUMENTS

| EP | 0626600 A1 | 11/1994 | ............... G02B 6/30 |
|---|---|---|---|
| GB | 2376756 A | 12/2002 | ............... G02B 6/30 |

OTHER PUBLICATIONS

Patent Cooperation Treaty International Search Report, Application No. PCT/US2014/020728, Jun. 18, 2014, 4 pages.

* cited by examiner

*Primary Examiner* — Eric Wong

(57) ABSTRACT

Circuit boards employing optical interfaces optically connected to surface-accessible, planar-shaped inter-board optical fiber traces, and related connectors, assemblies, and methods are disclosed. The circuit boards include inter-board optical fiber traces optically connected to optical components interfacing optical signals to electronic signal components in the circuit board. Providing inter-board optical fiber traces protects the optical fiber traces from the environment. To optically interface to the inter-board optical fiber traces, planar-shaped end portions of the inter-board optical fiber traces are provided surface accessible on the circuit board. In this manner, optical interfaces can be optically connected to planar-shaped, end portions of the inter-board optical fibers traces to establish optical connections. As an example, by the end portions of inter-board optical fiber traces being planar-shaped, the end portions of the inter-board optical fiber traces can be liquid displacing during assembly to avoid or reduce optical attenuation from liquid contamination.

27 Claims, 23 Drawing Sheets

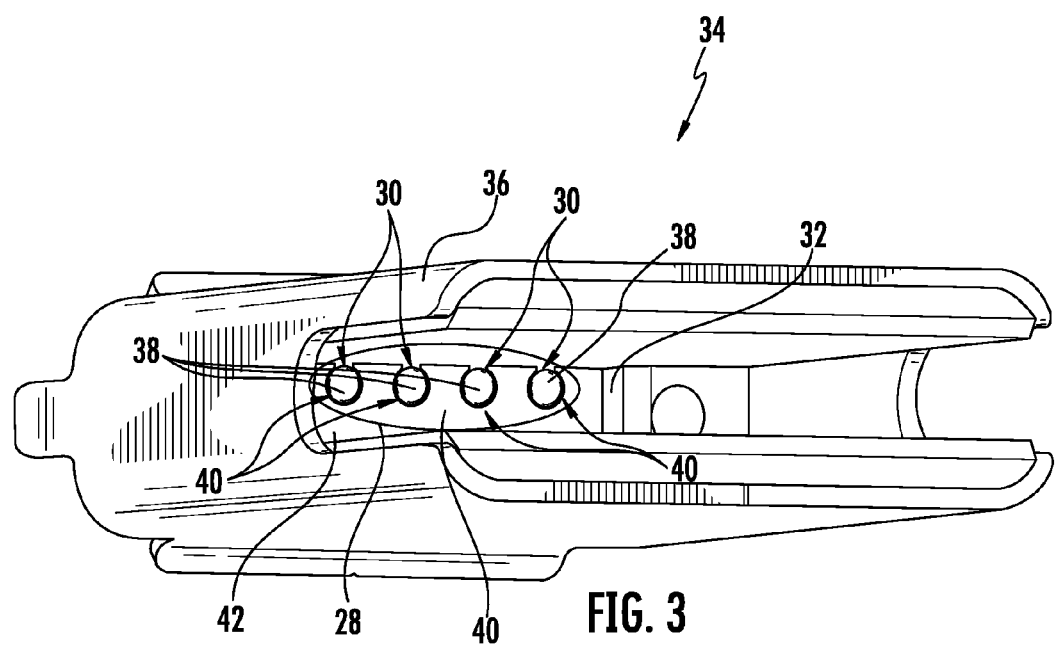

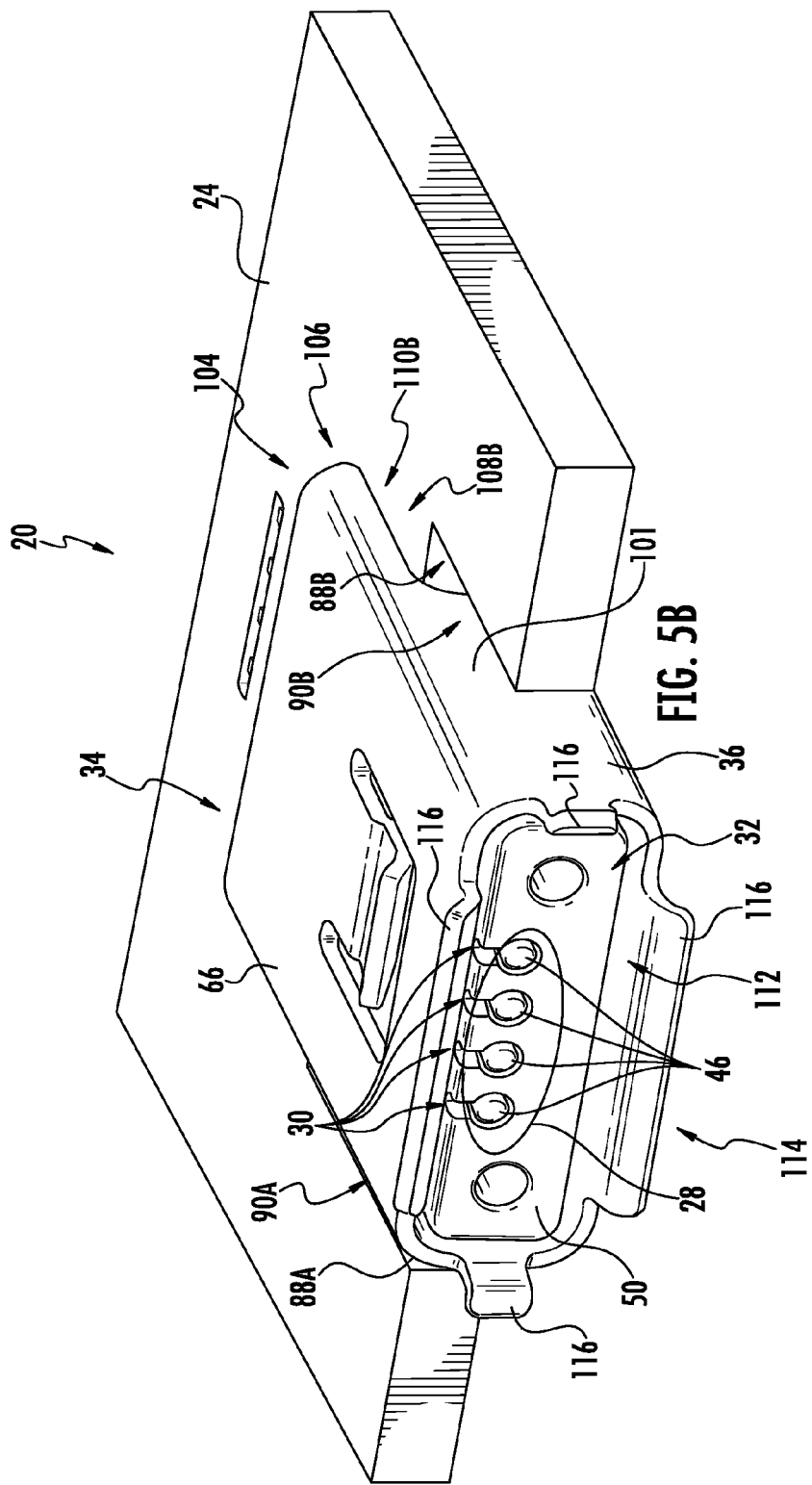

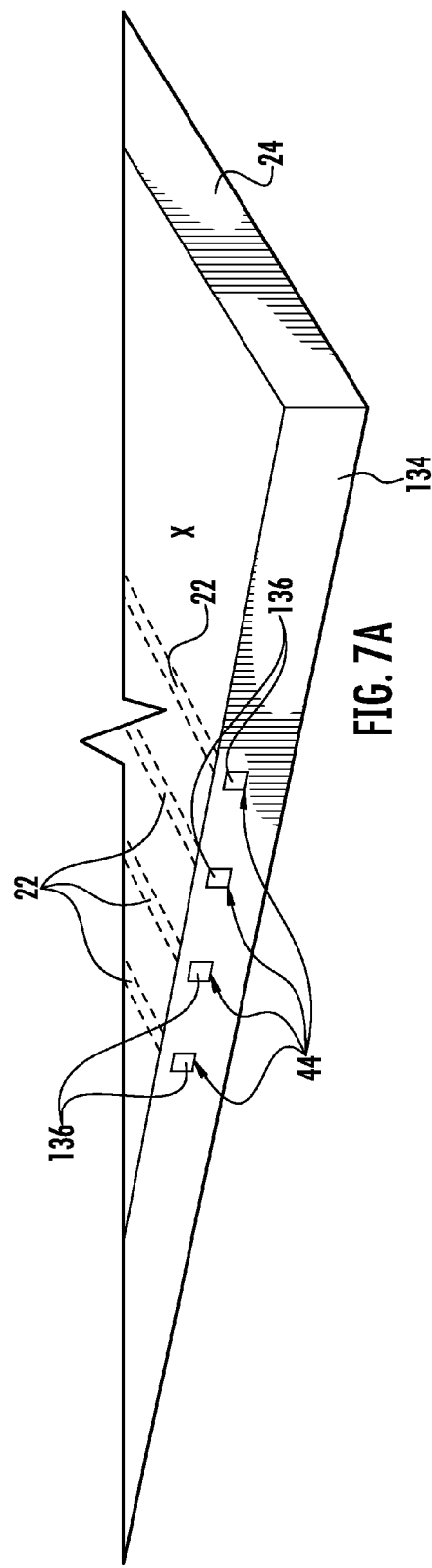

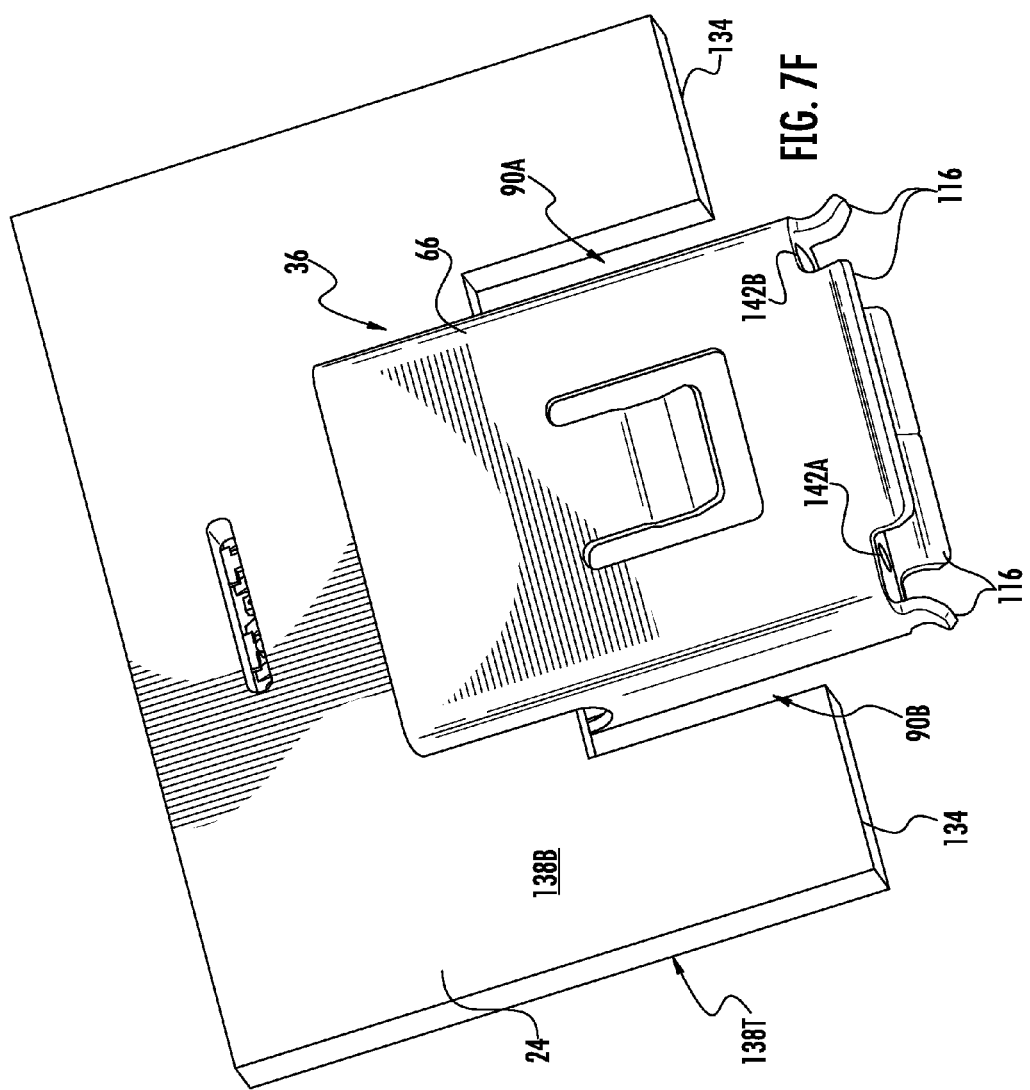

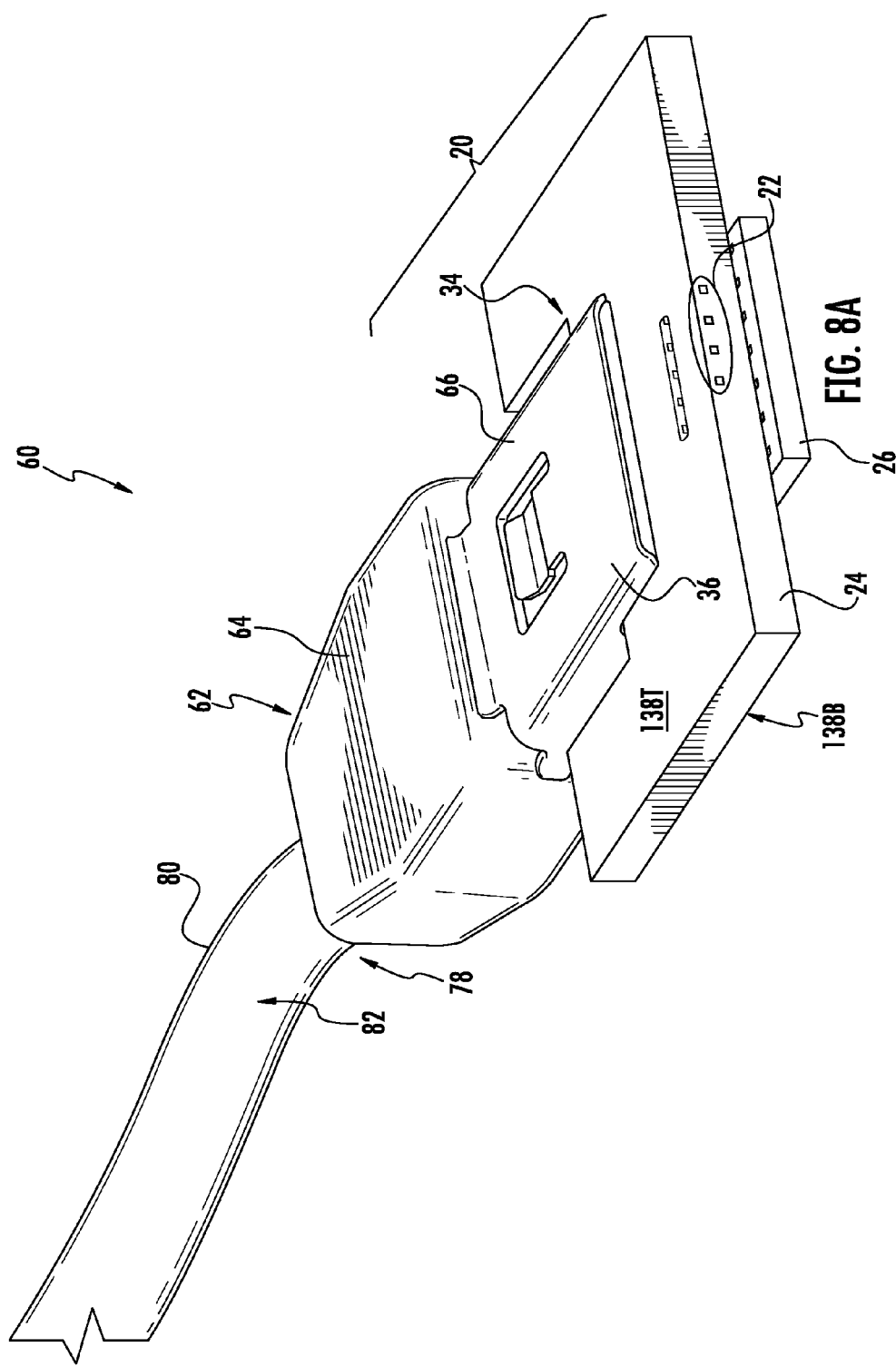

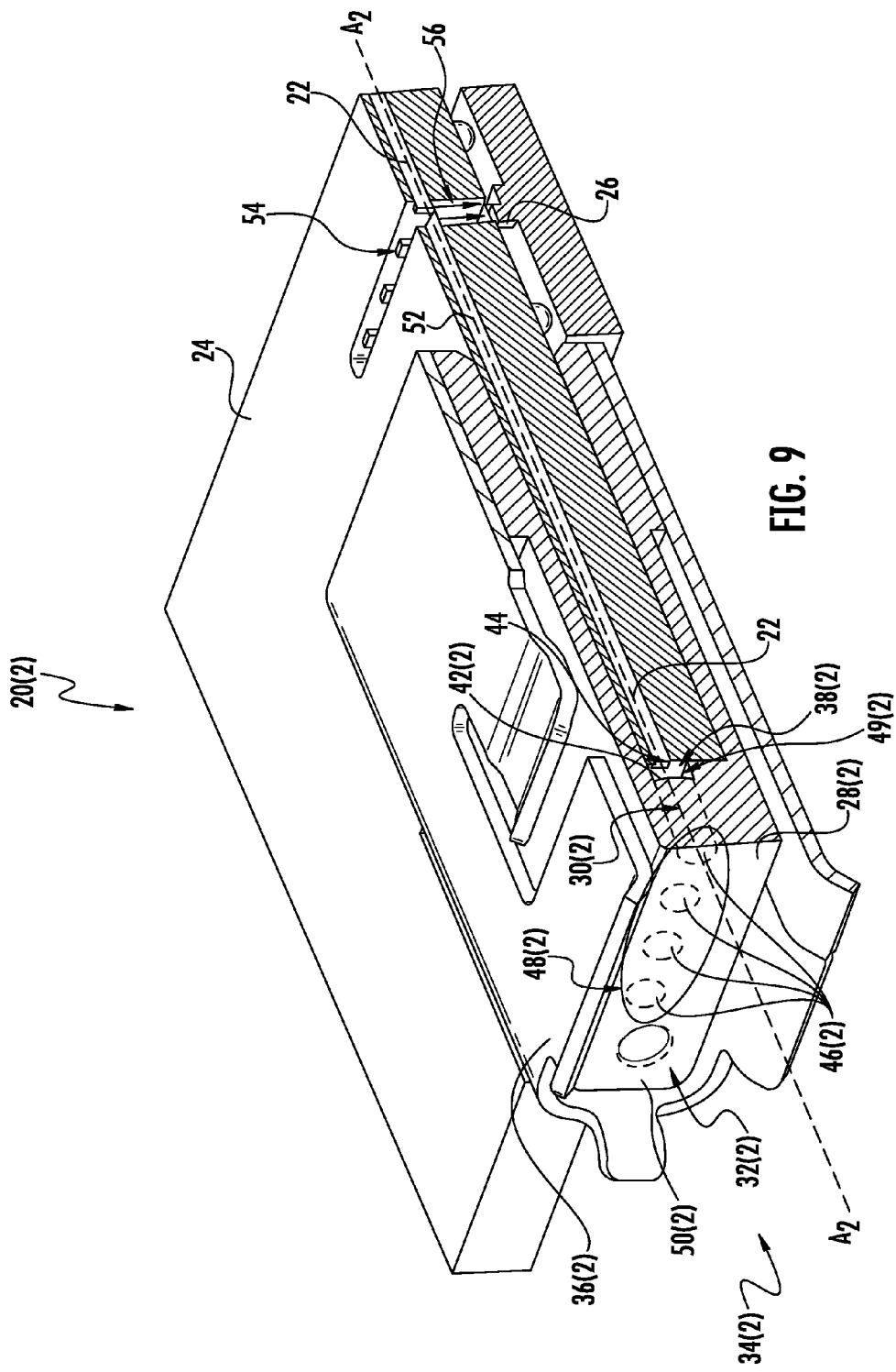

CIRCUIT BOARD(S) EMPLOYING OPTICAL INTERFACES OPTICALLY CONNECTED TO SURFACE-ACCESSIBLE, PLANAR-SHAPED, INTER-BOARD OPTICAL FIBER TRACES, AND RELATED CONNECTORS, ASSEMBLIES, AND METHODS

BACKGROUND

1. Field of the Disclosure

The technology of the disclosure relates to electronic circuit boards that include optical interfaces for converting optical signals into electrical signals and vice versa.

2. Technical Background

Benefits of optical fiber include extremely wide bandwidth and low noise operation. Because of these advantages, optical fiber is increasingly being used for a variety of applications, including but not limited to broadband voice, video, and data transmission. For example, fiber optic networks employing optical fiber are being developed and used to deliver voice, video, and data transmissions to subscribers over both private and public networks.

For example, optical fiber may be employed in data distribution centers or central offices for telecommunications and storage systems applications. These applications include, but are not limited to, server farms, such as for web page accesses, and remote storage equipment, such as for backup storage purposes, as examples. To provide for efficient management of this equipment, data centers include equipment racks, such as the equipment rack 10 illustrated in FIG. 1. The equipment rack 10 in FIG. 1 is comprised of rails 12A, 12B extending in a vertical direction and spaced a distance apart to support a plurality of modular housings 14 disposed between the rails 12A, 12B in vertical space. The modular housings 14 are configured to support information processing devices 16, such as computer servers, data storage devices, and/or other circuits in the form of blades 18, referred to herein as "cards 18."

The cards 18 are printed circuit board (PCB) cards 18. The PCB cards 18 contain electrical traces interconnecting electrical components mounted on the PCB card 18. If the PCB cards 18 are configured to support optical communications to benefit from the aforementioned advantages of optical fiber, optical interfaces are provided on the PCB cards 18. These optical interfaces can include transmitter optical sub-assemblies (TOSAs) (not shown) to convert electrical signals from the electrical components on the PCB card 18 into optical signals to be transmitted over optical fiber in a fiber optic cable. These optical interfaces can also include receiver optical sub-assemblies (ROSAs) (not shown) to convert received optical signals from optical fiber in a fiber optic cable into electrical signals to be routed over electrical traces in the PCB card 18 to electrical components on the PCB cards 18. The optical fiber of the fiber optic cable is interfaced to the PCB cards 18 through fiber optic connectors mounted on the PCB cards 18. The fiber optic connectors mounted on the PCB cards 18 are optically connected to a TOSA and ROSA through optical fibers mounted on the surface of the PCB card 18 to support optical fiber interfacing between fiber optic cables and the electronic components on the PCB card 18.

Optical fiber interfacing is also being employed in smaller, consumer electronic devices to provide the benefit of enhanced communications performance of optical fiber. Examples of such consumer electronics include, but are not limited to, personal computers, notebook computers, computer tablets, digital cameras, mobile phones, and other mobile devices. These consumer electronic devices also employ circuit boards such as printed circuit boards (PCB(s)) that route electrical signals between electrical components and circuits disposed in the PCB to perform the operations of the electronic devices. Thus, to provide optical communications interfacing these electronic devices just as provided in the data center electronic devices described above, the PCBs can be fitted with fiber optic connectors mounted on the PCB. The fiber optic connections are optically connected to the TOSA and ROSA through optical fibers mounted on the surface of the PCB to support optical fiber interfacing between fiber optic cables and the electronic components on the PCB.

SUMMARY OF THE DETAILED DESCRIPTION

Embodiments disclosed herein include circuit boards employing optical interfaces optically connected to surface-accessible, planar-shaped inter-board optical fiber traces. Related connectors, assemblies, and methods are also disclosed. In certain embodiments disclosed herein, circuit boards are provided that contain inter-board optical fiber traces. Inter-board optical fiber traces are optical fiber traces fully or partially embedded within a circuit board, including but not limited to near surface of a circuit board or partially exposed to a surface of a circuit board. The inter-board optical fiber traces are optically connected to optical components that interface optical signals to electronic signal components in the circuit board. Providing inter-board optical fiber traces in the circuit board protects the delicate optical fiber traces from the environment. Providing inter-board optical fiber traces in the circuit board can also isolate the optical fiber traces from circuit board processes, such as wave soldering for example. To provide optical interfacing to the inter-board optical fiber traces in the circuit board, planar-shaped end portions of the inter-board optical fiber traces are made surface accessible on the circuit board.

To establish optical connections with the surface-accessible, planar-shaped, inter-board optical fiber traces, optical interfaces (e.g., optical lenses) from an optical interface body, are optically connected to the surface accessible end portions of the inter-board optical fiber traces on the circuit board. In this manner, as a non-limiting example, by the end portions of the inter-board optical fiber traces being planar-shaped, the optical interfaces are configured to be liquid displacing to avoid or reduce optical attenuation from liquid contamination during assembly, such as wave solder flow for example. In this regard, liquid disposed on either the optical interfaces or the end portions of the inter-board optical fiber traces during assembly can be displaced or substantially displaced when the optical interfaces optically connect to the planar-shaped end portions of the inter-board optical fiber traces in the circuit board. The end portions of the optical interfaces may also be planar-shaped. Also, as another non-limiting example, by the optical interfaces and end portions of the inter-board optical fiber traces being surface accessible, the optical interfaces and end portions of the inter-board optical fiber traces provide accessible surfaces for cleaning before or during assembly, if desired, to avoid or reduce optical attenuation.

In this regard, in one embodiment, a circuit board assembly is provided. The circuit board assembly comprises a circuit board. The circuit board comprises at least one inter-board optical fiber trace having at least one planar-shaped end portion accessible through an end surface of the circuit board. The circuit board assembly also comprises at least one optical interface disposed in a ferrule. The at least one optical interface has at least one end portion accessible through a coupling face of the ferrule. The at least one optical interface of the circuit board assembly is alignably mounted on the circuit board to optically connect the at least one end portion of the at least one optical interface, to the at least one planar-shaped end portion of the at least one inter-board optical fiber trace of the circuit board.

In another embodiment, a method of preparing a circuit board assembly is provided. The method comprises providing a circuit board comprising at least one inter-board optical fiber trace. The method also comprises exposing at least one end portion of the at least one inter-board optical fiber trace through an end surface of the circuit board to provide at least one surface-accessible, planar-shaped end portion of the at least one inter-board optical fiber trace. The method also comprises mounting a ferrule comprising at least one optical interface to the circuit board. The method also comprises optically connecting at least one end portion of the at least one optical interface accessible through a coupling face of the ferrule, to the at least one planar-shaped end portion of the at least one inter-board optical fiber trace of the circuit board.

In another embodiment, an electro-optical connection assembly is provided. The electro-optical connection assembly comprises an electronic device. The electronic device comprises a circuit board comprising at least one inter-board optical fiber trace having at least one first planar-shaped end portion accessible through an end surface of the circuit board, and at least one second planar-shaped end portion optically connected to at least one optical interface device optically interfaced to at least one electronic component disposed on the circuit board. The electronic device also comprises a first fiber optic connector comprising a ferrule comprising at least one optical interface disposed in a ferrule. The at least one optical interface has at least one end portion accessible through a coupling face of the ferrule. The ferrule is alignably mounted on the circuit board to optically connect the at least one end portion of the at least one optical interface, to the at least one planar-shaped first end portion of the at least one inter-board optical fiber trace of the circuit board. The electro-optical connection assembly also comprises a second fiber optic connector of a fiber optic cable mated to the first fiber optic connector of the electronic device. The second fiber optic connector of the fiber optic cable is mated to the first fiber optic connector of the electronic device to optically connect at least one optical fiber of the fiber optic cable to the at least one optical interface device.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 3 is a rear side, perspective view of the assembled fiber optic connector of the PCB assembly in FIG. 2;

FIG. 5B is a front side, perspective assembled view of the PCB assembly in FIG. 5A;

FIG. 7A is a front side, perspective view of the PCB of the PCB assembly in FIGS. 5A and 5B before alignment slots for aligning the fiber optic connector are disposed into the PCB;

FIG. 7F is a top perspective view of the assembled fiber optic connector mounted to the PCB of the PCB assembly in FIG. 7E;

FIG. 8A is a rear side, perspective view of the fiber optic receptacle of the PCB assembly in FIGS. 5A and 5B receiving a fiber optic connector of a connectorized fiber optic cable to optically connect the optical interfaces of the fiber optic connector to the surface-accessible, planar-shaped inter-board optical fiber traces in the PCB;

FIG. 9 is a front side, perspective cross-sectional view of another exemplary printed circuit board (PCB) assembly employing optical interfaces in a fiber optic connector optically connected to surface-accessible, planar-shaped inter-board optical fiber traces in the PCB;

DETAILED DESCRIPTION

Figure 1:
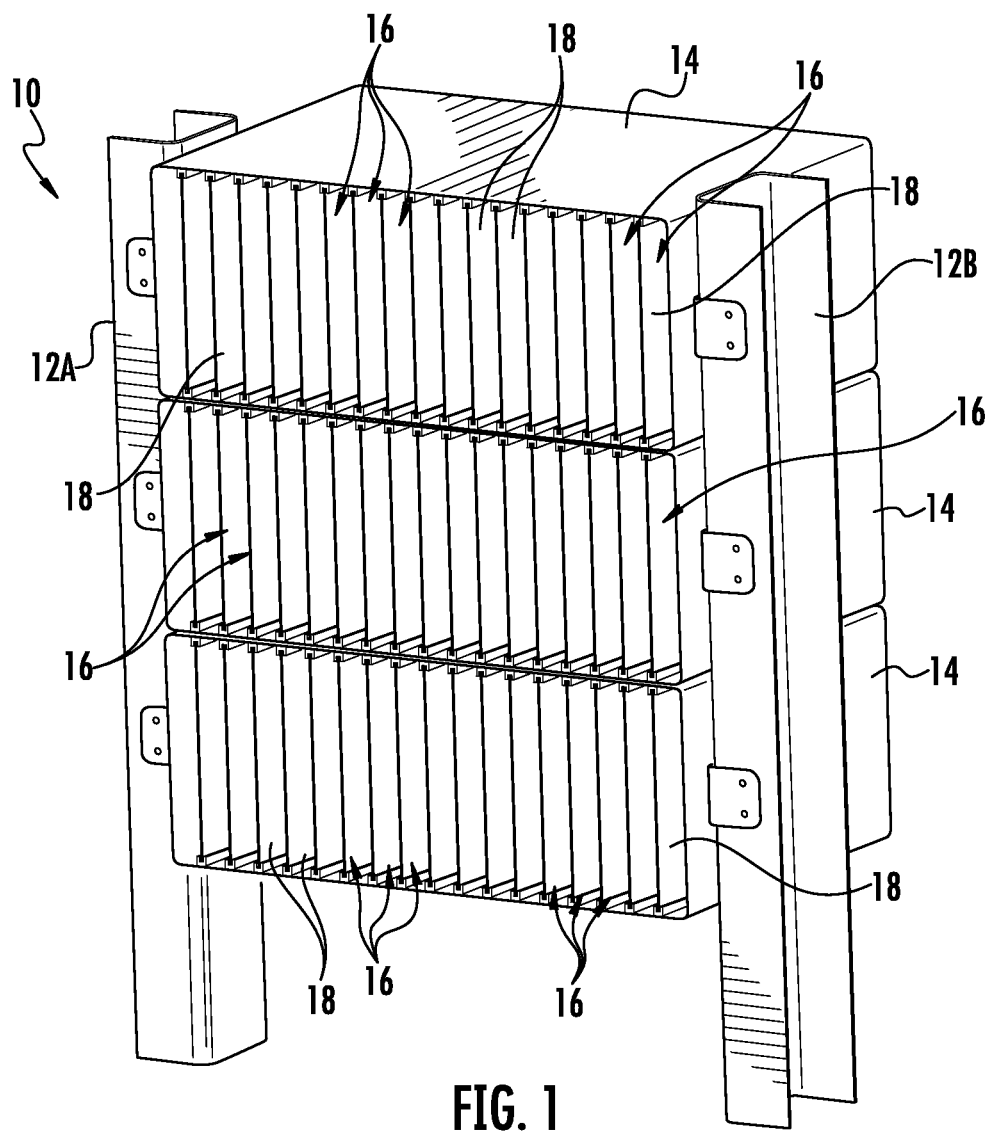
FIG. 1 is a front perspective view of an exemplary equipment rack supporting rack module housings each supporting a plurality of information processing modules.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include circuit boards such as printed circuit boards (PCBs) employing optical interfaces optically connected to surface-accessible, planar-shaped inter-board optical fiber traces. Although the concepts disclosed herein are directed to circuit board assemblies and circuit boards, the embodiments described below refer to non-limiting examples using printed circuit boards (PCB(s)) and PCB assemblies, and are merely explanatory in nature and not intended to be limiting. Related connectors, assemblies, and methods are also disclosed. In certain embodiments disclosed herein, PCBs are provided that contain inter-board optical fiber traces. Inter-board optical fiber traces are optical fiber traces fully or partially embedded within a PCB, including but not limited to near surface of a PCB or partially exposed to a surface of a PCB. The inter-board optical fiber traces are optically connected to optical components that interface optical signals to electronic signal components in the PCB. Providing inter-board optical fiber traces in the PCB protects the delicate optical fiber traces from the environment. Providing inter-board optical fiber traces in the PCB can also isolate the optical fiber traces from PCB processes, such as wave soldering for example. To provide optical interfacing to the inter-board optical fiber traces in the PCB, planar-shaped end portions of the inter-board optical fiber traces are made surface accessible on the PCB.

To establish optical connections with the surface-accessible, planar-shaped, inter-board optical fiber traces, optical interfaces (e.g., optical lenses) from an optical interface body, are optically connected to the surface accessible end portions of the inter-board optical fiber traces on the PCB. In this manner, as a non-limiting example, by the end portions of the inter-board optical fiber traces being planar-shaped, the optical interfaces are configured to be liquid displacing to avoid or reduce optical attenuation from liquid contamination during assembly, such as wave solder flow for example. In this regard, liquid disposed on either the optical interfaces or the end portions of the inter-board optical fiber traces during assembly can be displaced or substantially displaced when the optical interfaces optically connect to the planar-shaped end portions of the inter-board optical fiber traces in the PCB.

The end portions of the optical interfaces may also be planar-shaped. Also, as another non-limiting example, by the optical interfaces and end portions of the inter-board optical fiber traces being surface accessible, the optical interfaces and end portions of the inter-board optical fiber traces provide accessible surfaces for cleaning before or during assembly, if desired, to avoid or reduce optical attenuation.

Figure 2:
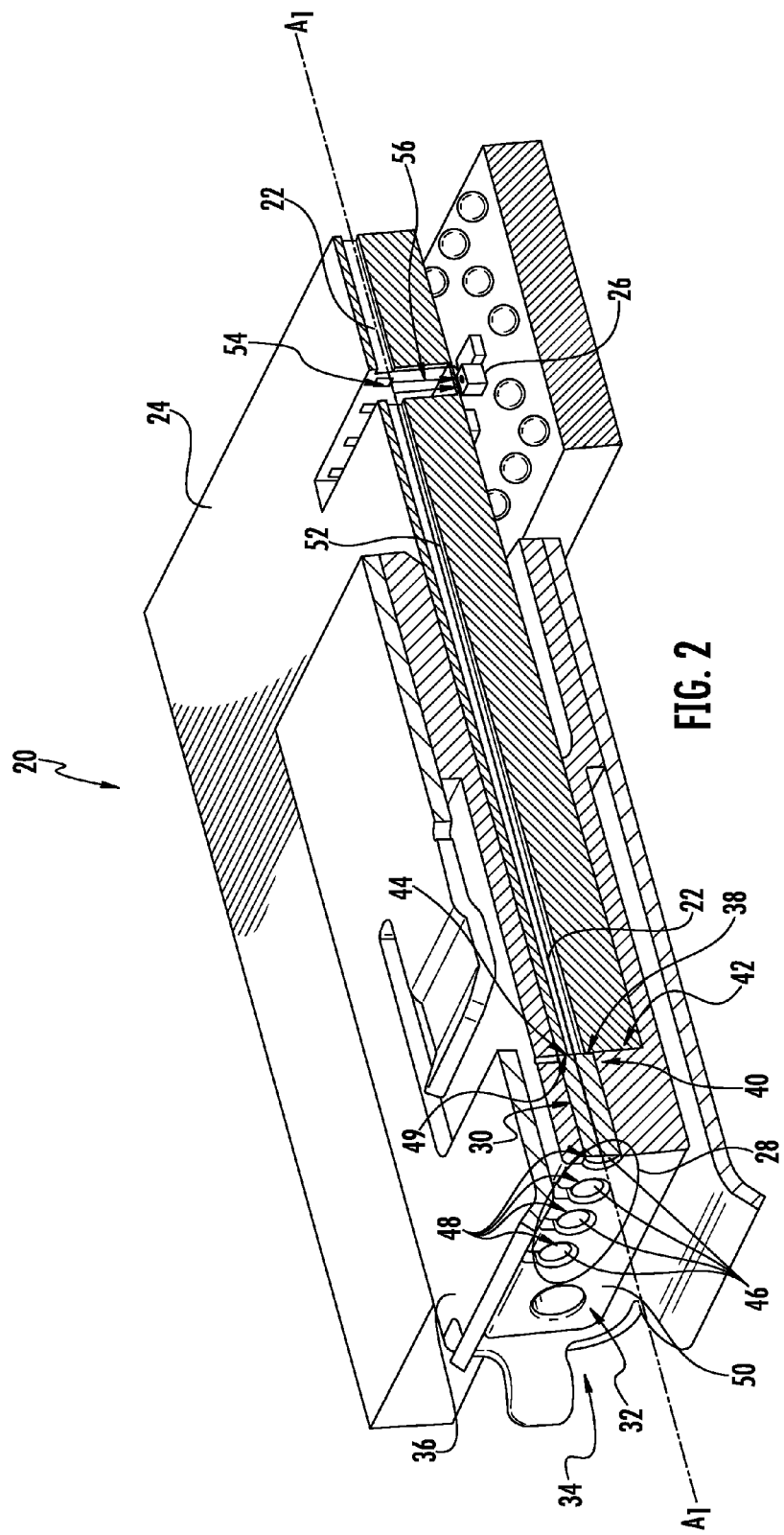
FIG. 2 is a front side, perspective cross-sectional view of an exemplary circuit board assembly such as a printed circuit board (PCB) assembly employing optical interfaces in a fiber optic connector optically connected to surface-accessible, planar-shaped inter-board optical fiber traces in the PCB.

In this regard, FIG. 2 is a side perspective view of an exemplary PCB assembly 20. For example, the PCB assembly 20 can be included in an electronics device to support electronic components. The PCB assembly 20 in FIG. 2 includes inter-board optical fiber traces 22 disposed in a PCB 24. "Inter-board" optical fiber traces are optical fiber traces embedded within a PCB, including near surface and/or just below a surface of a PCB. The inter-board optical fiber traces 22 may be fully or partially disposed within the PCB 24. Providing inter-board optical fiber traces 22 in the PCB 24 protects the delicate optical fiber traces 22 from the environment, and can isolate the optical fiber traces 22 from PCB 24 processes, such as wave soldering for example. The inter-board optical fiber traces 22 are optically connected to one or more active optical components 26 mounted to the PCB 24 to transmit and receive optical signals to and from the inter-board optical fiber traces 22. For example, the active optical components 26 may include components for a receiver optical sub-assembly (ROSA) and/or transmitter optical sub-assembly (TOSA) (e.g., laser diodes, photodiodes) for converting optical signals from the inter-board optical fiber traces 22 to electrical signals and vice versa, respectively. The active optical components 26 provide electrical signal interfacing to electrical components (not shown) on the PCB 24 to provide optical interfacing for the PCB assembly 20. In this manner, the PCB assembly 20 benefits from an optical communications interface having communication performance advantages of optical fiber.

With continuing reference to FIG. 2, to provide for an external fiber optic cable to establish an optical connection with the inter-board optical fiber traces 22 and active optical components 26, optical interfaces 28 are included in the PCB assembly 20. The optical interfaces 28 are supported in channels 30 that are disposed in a ferrule 32. The ferrule 32 is mounted to the PCB 24 in this example. The ferrule 32 is provided as part of a fiber optic connector 34 in the form of a fiber optic receptacle 36 in this example. For example, the optical interfaces 28 may be GRIN lenses as a non-limiting example. Rear end portions 38 of the optical interfaces 28 are exposed through rear openings 40 of the channels 30 disposed in a rear coupling face 42 (or rear mating face 42) of the ferrule 32 to be surface-accessible, as illustrated in the rear side, perspective view of the assembled fiber optic receptacle 36 in FIG. 3. The rear end portions 38 of the optical interfaces 28 are also planar-shaped in this embodiment, as a non-limiting example.

"Surface-accessible" means exposed through a surface for providing optical connections. "Planar-shaped" means that an optical interface is generally or substantially flat such that the optical interface or surface is accessible and easily wiped by a user (i.e., cleaned to remove dirt, dust and/or debris). The optical interface 28 may be recessed, flush, protrude, and/or be angled from a coupling face, as desired. As an example, the rear end portions 38 of the optical interface 28 in this embodiment are planar-shaped even if the optical interface 28 is angled with respect to a coupling face, such as an angle between zero degrees and ten degrees, although other angles are possible.

With reference back to FIG. 2, when the ferrule 32 is installed on the PCB 24, the planar-shaped rear end portions 38 of the optical interfaces 28 are placed in optical contact to planar-shaped end portions 44 of the inter-board optical fiber traces 22 that are surface-accessible from the PCB 24, as one example. In this manner, when a fiber optic cable (not shown) is connected to the fiber optic receptacle 36, an optical connection is established between optical fibers in the fiber optic cable to front end portions 46 of the optical interfaces 28 disposed through front openings 48 of the channels 30 disposed through a front coupling face 50 (or front mating face 50) of the ferrule 32. This optical connection provides an optical connection to the planar-shaped end portions 44 of the inter-board optical fiber traces 22, which in turn, provides an optical connection to the active optical components 26 on the PCB 24. The optical connection path between the active optical components 26 and the front end portions 46 of the optical interfaces 28 is shown by the optical path 52 in FIG. 2. A total internal reflection (TIR) surface 54 is employed to direct light from a longitudinal axis $A_1$ of the inter-board optical fiber traces 22 and free space 56 disposed in the PCB 24 between the inter-board optical fiber traces 22 and the active optical components 26. Placing the rear end portions 38 of the optical interfaces 28 in optical contact to planar-shaped end portions 44 of the inter-board optical fiber traces 22 can avoid contaminate substances, such as liquid or other substances, that can cause optical attenuation, from being disposed between the rear end portions 38 of the optical interfaces 28 in optical contact to planar-shaped end portions 44 of the inter-board optical fiber traces 22.

As another non-limiting example, the planar-shaped rear end portions 38 of the optical interfaces 28 in FIG. 2 may be placed a distance away from the planar-shaped end portions 44 of the inter-board optical fiber traces 22, non-limiting example. For example, the planar-shaped rear end portions 38 of the optical interfaces 28 may be placed up to three hundred (300) micrometers (μm) from the planar-shaped end portions 44 of the inter-board optical fiber traces 22. In this example, with the end portions 38 of the optical interfaces 28 not placed in direct contact with the planar-shaped end portions 44 of the inter-board optical fiber traces 22, an index-matching adhesive 49 may be disposed therebetween. The index-matching adhesive 49 provides the optical connection without the optical signal traveling through air between the end portions 38 of the optical interfaces 28 and the planar-shaped end portions 44 of the inter-board optical fiber traces 22. This may avoid contaminate substances, such as liquid or other substances that can cause optical attenuation, from being disposed between the rear end portions 38 of the optical interfaces 28 in optical contact to planar-shaped end portions 44 of the inter-board optical fiber traces 22.

By providing rear end portions 38 of the optical interfaces 28 and the end portions 44 of the inter-board optical fiber traces 22 as planar-shaped end portions, liquid disposed on either the optical interfaces 28 or the inter-board optical fiber traces 22 will be displaced or substantially displaced during assembly of the PCB assembly 20. Liquid disposed on either the end portions 38 of the optical interfaces 28 and the end portions 44 of the inter-board optical fiber traces 22 can cause optical attenuation. Liquid may be disposed on the end portions 38 of the optical interfaces 28 and the end portions 44 of the inter-board optical fiber traces 22 for a number of reasons. For example, solder from wave soldering PCB processes may be disposed on the end portions 38 of the optical interfaces 28 and the end portions 44 of the inter-board optical fiber traces 22. Further, liquid introduced during use of an electronic device incorporating the PCB assembly 20, can be displaced by the planar-shaped end portions 38 of the optical interfaces 28 and the planar-shaped end portions 44 of the inter-board optical fiber traces 22. Liquid posed on a planar-shaped surface tends to be displaced when placed into contact with another planar-shaped surface. Liquids present on either optically transmissive end portion of an optical fiber or lens are displaced (i.e., spread-out) upon coupling. In some embodiments, end portions 38 of the optical interfaces 28 and/or the end portions 44 of the inter-board optical fiber traces 22 may be coated with a coating or otherwise treated such that it is hydrophobic, and any liquid present thereon is easily displaced, thereby reducing the lens affect for any liquid present. Other coatings or treatments may be applied, such as chemical strengthening, anti-reflection, lamination, diffractive, and hydrophilic coatings as desired.

Figure 4A:
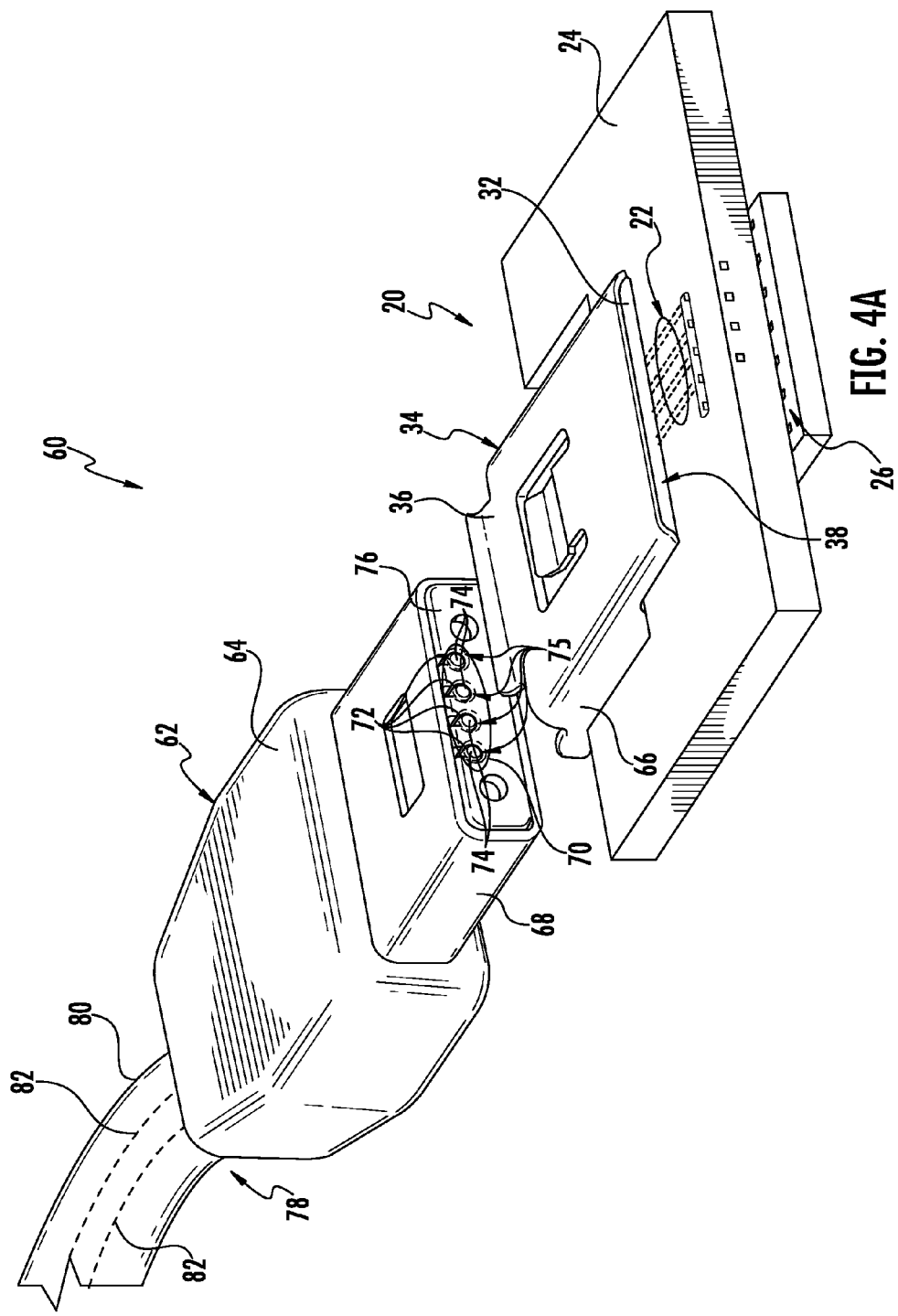
FIG. 4A is a side, perspective view of an exemplary electro-optical connection assembly employing the PCB assembly of FIG. 2, wherein the fiber optic connector (e.g., fiber optic receptacle) of the PCB assembly is configured to receive an exemplary fiber optic connector (e.g., fiber optic plug) of a fiber optic cable to establish an optical connection between the fiber optic cable and the inter-board optical fiber traces in the PCB.
Figure 4B:
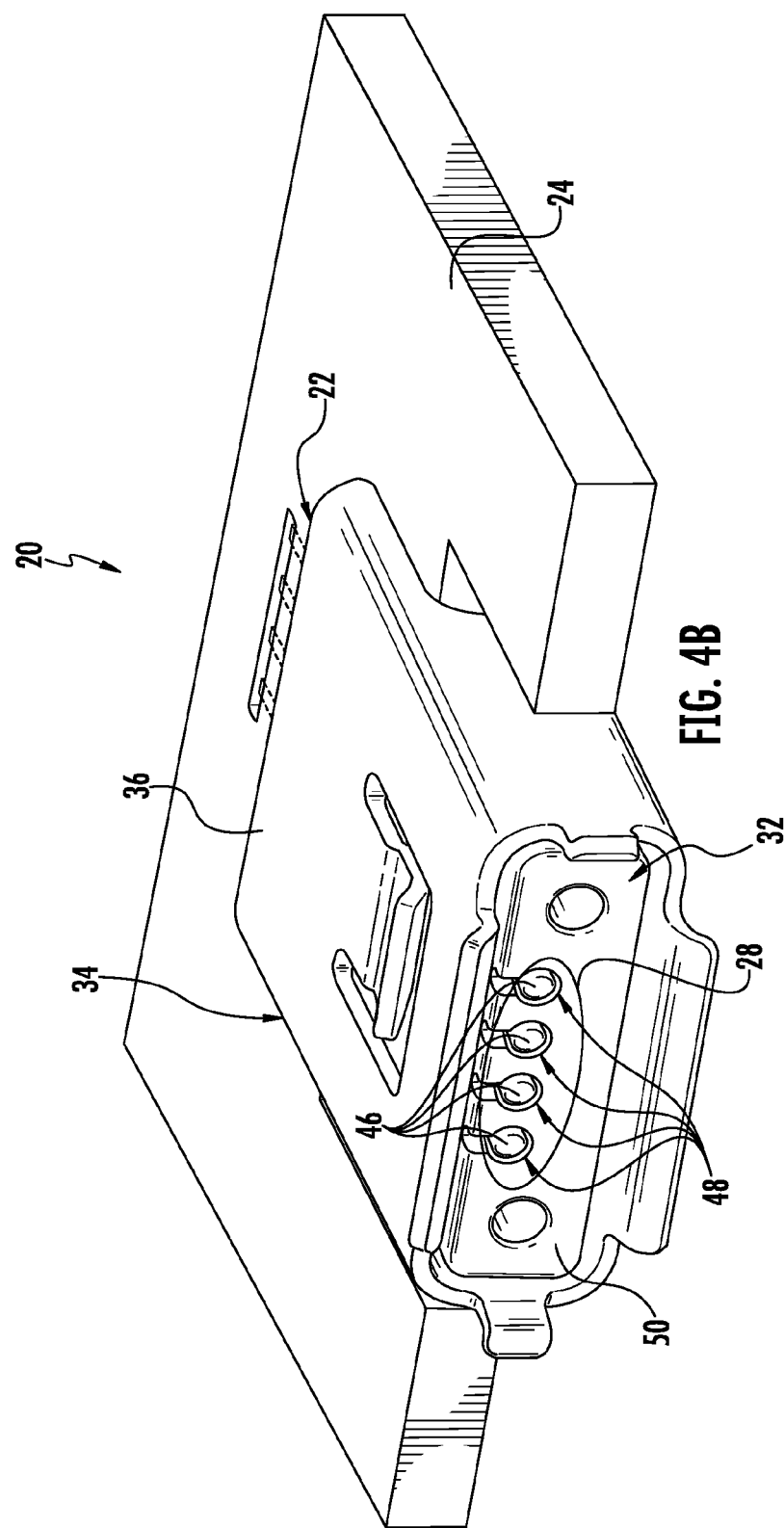
FIG. 4B is front side, perspective view of the PCB assembly in FIG. 4A.

FIG. 4A is a side, perspective view of an exemplary electro-optical connection assembly 60 employing the PCB assembly 20 of FIG. 2. FIG. 4B is a front side, perspective view of the PCB assembly 20 in FIG. 4A. The electro-optical connection assembly 60 in FIG. 4A involves establishing optical connections to the optical interfaces 28 to establish optical connections to the active optical components 26 on the PCB 24 via the inter-board optical fiber traces 22. In this regard, the fiber optic receptacle 36 of the PCB assembly 20 is configured to receive an exemplary fiber optic connector 62 in the form of a fiber optic plug 64. The fiber optic receptacle 36 includes a connector shroud 66, which is made from a metal material in this embodiment, to receive the fiber optic plug 64 and optically connect the fiber optic plug 64 to the optical interfaces 28 of the fiber optic receptacle 36. In this regard, the fiber optic plug 64 includes a ferrule 68. Optical interfaces 70 are disposed in channels 72 disposed inside the ferrule 68. End portions 74 of the optical interfaces 70 are disposed through openings 75 of the channels 72 disposed through a front coupling face 76 (or front mating face 76) of the ferrule 68. For example, the optical interfaces 70 may be GRIN lenses as a non-limiting example. As another example, the optical interfaces 70 may include refractive or diffractive components instead of GRIN lenses for providing optical coupling.

With continuing reference to FIG. 4A, the fiber optic plug 64 is disposed on an end portion 78 of a fiber optic cable 80 to establish optical connections with optical fibers 82 disposed within the fiber optic cable 80. Specifically, the optical interfaces 70 in fiber optic plug 64 are optically connected with optical fibers 82 of the fiber optic cable 80. In this manner, the optical fibers 82 of the fiber optic cable 80 are optically connected to the active optical components 26 on the PCB 24, via the inter-board optical fiber traces 22, when the fiber optic plug 64 is received in the fiber optic receptacle 36 of the PCB assembly 20.

Figure 5A:
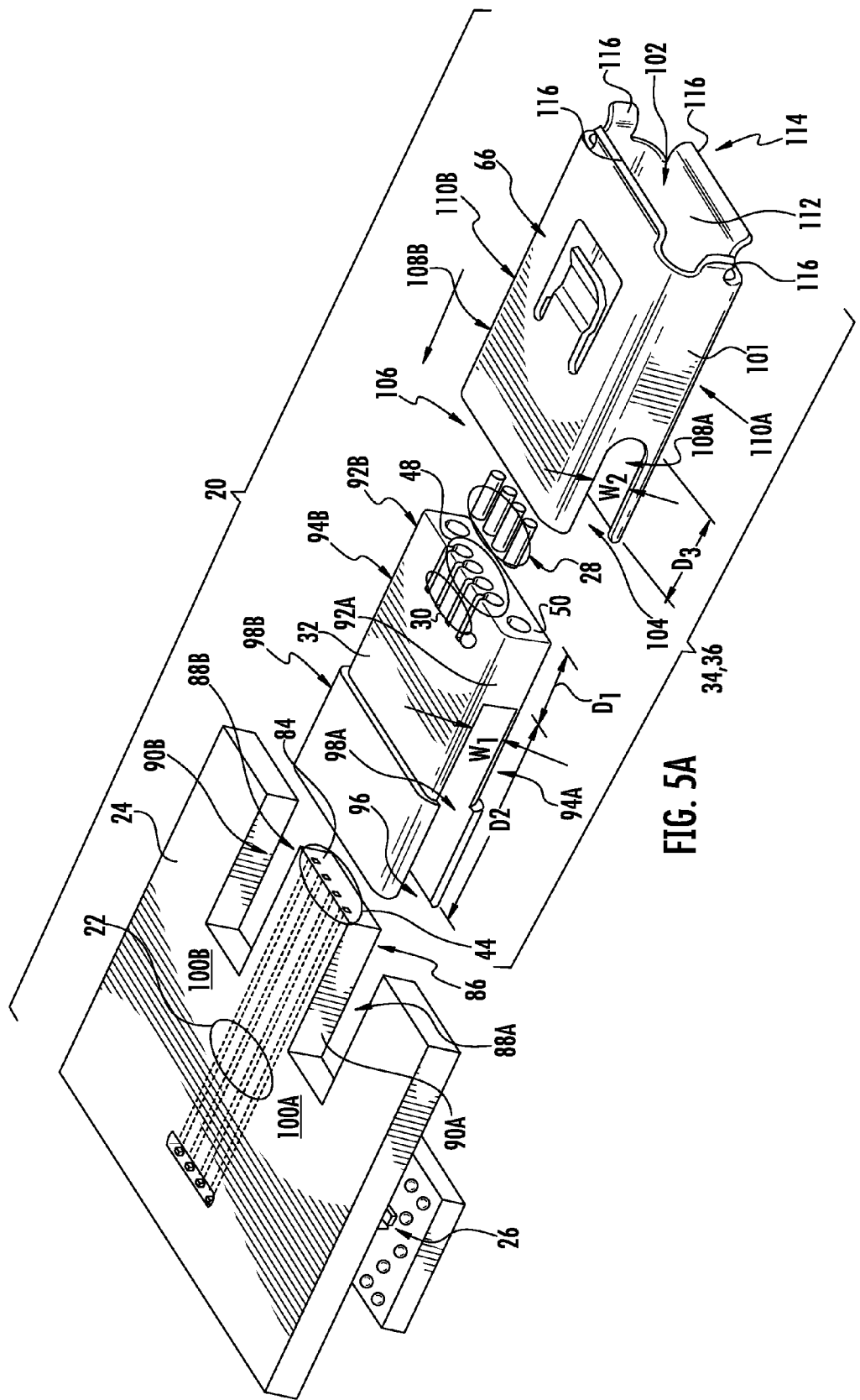
FIG. 5A is a front side, perspective exploded view of the exemplary PCB assembly having an exemplary fiber optic connector employing optical interfaces optically connected to end portions of the surface-accessible, planar-shaped inter-board optical fiber traces in the PCB in FIG. 2.
Figure 6:
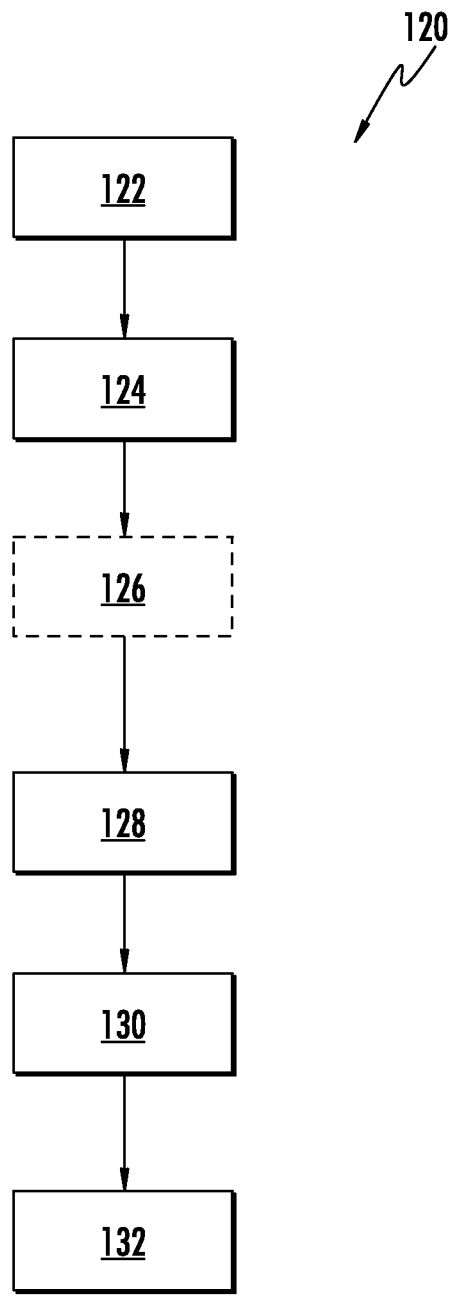
FIG. 6 is a flowchart illustrating an exemplary process for assembling the PCB assembly in FIGS. 5A and 5B.

Now that the PCB assembly 20 employing the surface-accessible, planar-shaped optical interfaces 28 optically connected to inter-board optical fiber traces 22 has been described, exemplary details of exemplary components of the PCB assembly 20 and an exemplary method of providing the PCB assembly 20 will now be described. FIGS. 5A and 5B, described below, are front side, perspective exploded and assembled views, respectively, of the PCB assembly 20 in FIG. 2. FIG. 6, described below, is a flowchart illustrating an exemplary process for assembling the PCB assembly 20 in FIG. 2. FIGS. 7A-7E, described below, are described in conjunction with the exemplary process for assembling the PCB assembly 20 in FIG. 6 to show the PCB assembly 20 in its various stages during assembly.

In this regard, FIG. 5A is a front side, perspective exploded view of the PCB assembly 20 in FIG. 2. FIG. 5B is a front side, perspective assembled view of the PCB assembly 20 in FIG. 2. As illustrated in FIG. 5A and discussed above, the PCB 24 having inter-board optical fiber traces 22 is provided as part of the PCB assembly 20. One or more of the active optical components 26 is mounted to the PCB 24 and optically connected to the inter-board optical fiber traces 22. As a non-limiting example, the PCB 24 may be made from FR4, which is a composite material composed of woven fiberglass cloth with an epoxy resin binder that is flame resistant. Optical connections to the active optical components 26 in the PCB assembly 20 can be established by optical connection to the surface-accessible end portions 44 of the inter-board optical fiber traces 22. The end portions 44 of the inter-board optical fiber traces 22 are exposed through an end surface 84 of a PCB post 86 of the PCB 24.

As will be described in more detail below, the PCB post 86 of the PCB 24 provides alignment surfaces 88A, 88B to receive the fiber optic receptacle 36 for mounting to the PCB 24. The alignment surfaces 88A, 88B in this embodiment allow for passive alignment of the rear end portions 38 of the optical interfaces 28 of the fiber optic receptacle 36, to the end portions 44 of the optical fiber traces 22. The PCB post 86 is formed from two alignment slots 90A, 90B that are disposed in the PCB 24 by cutting the PCB 24 during assembly of the PCB assembly 20. The alignment surfaces 88A, 88B provide data (i.e., datum) by which the fiber optic receptacle 34 and its ferrule 32 can align to PCB post 86. The alignment slots 90A, 90B are disposed in the PCB 24 in a known location to provide the alignment surfaces 88A, 88B in the PCB post 86 in a known location with respect to the inter-board optical fiber traces 22. In this manner, the alignment surfaces 88A, 88B optically align the rear end portions 38 of the optical interfaces 28 disposed through the rear coupling surface 44 of the ferrule 32 (illustrated in FIG. 3) to the end portions 44 of the inter-board optical fiber traces 22, as illustrated in FIG. 5A. Also note that two alignment slots 90A, 90B are not required. For example, one alignment slot could be provided in the PCB 24.

With reference to FIG. 5A, as discussed above, the PCB assembly 20 also includes the fiber optic receptacle 36. The fiber optic receptacle 36 includes the ferrule 32 that is configured to be mounted to the PCB 24 to provide an optical connection between the optical interfaces 28 in the fiber optic receptacle 36 and the inter-board optical fiber traces 22. In this example, because the optical interfaces 28 are gradient index (GRIN) lenses, the ferrule 32 is also referred to in this embodiment as a GRIN lens holder. GRIN lenses offer an alternative to polishing curvatures onto ends of optical fibers to form lenses. GRIN lenses focus light through a precisely controlled radial variation of the lens material's index of refraction from the optical axis to the edge of the lens. The internal structure of this index gradient can dramatically reduce the need for tightly controlled surface curvatures and results in a simple, compact lens. A GRIN lens can be provided in the form of a glass rod that is disposed in a lens holder as part of a fiber optic connector. The flat surface on the end face of a GRIN lens can reduce aberrations, because the end faces can be polished to be planar or substantially planar to the end face of the ferrule. The flat surface of the GRIN lens allows for easy cleaning of end faces of the GRIN lens. It is important that the GRIN lens holder be designed with internal holders that place and secure the GRIN lenses in alignment with the desired angular accuracy to avoid or reduce coupling loss. However, as another example, the optical interfaces 28 could include refractive or diffractive components instead of GRIN lenses for providing optical connections, as non-limiting examples.

With continuing reference to FIG. 5A, to mount the ferrule 32 to the PCB 24 in this example, the ferrule 32 includes two side mating surfaces 92A, 92B on sides 94A, 94B of the ferrule 32. The side mating surfaces 92A, 92B both extend from the front coupling face 50 a certain distance $D_1$ back to a rear end 96 of the ferrule 32, as illustrated in FIG. 5A. Side slots 98A, 98B are disposed on each side of the ferrule 32 adjacent to the side mating surfaces 92A, 92B. The side slots 98A, 98B are provided of width $W_1$ in the sides 94A, 94B of the ferrule 32 and of length $D_2$ from the rear end 96 of the ferrule 32. The side slots 98A, 98B are provided in the sides 94A, 94B of the ferrule 32 to allow the ferrule 32 to slide back onto the PCB post 86. As illustrated in FIGS. 5A and 5B, side slots 98A, 98B receive portions 100A, 100B of the PCB 24 to allow the rear coupling face 42 of the ferrule 32 (FIG. 3) to be disposed adjacent to the end surface 84 of the PCB post 86 to place the end portions 44 of the optical fiber traces 22 in optical contact with the rear end portions 38 of the optical interfaces 28 (FIG. 3). The optical interfaces 28 are shown exposed from the channels 30 of the ferrule 32 in FIG. 5A, and assembled in FIG. 5B. The channels 30 can serve to protect the optical interfaces 28 and provide a "hidden-pin" fiber optic receptacle 36 design.

With reference back to FIG. 5A, the connector shroud 66 of the fiber optic receptacle 36 is shown separated from the ferrule 32 of the fiber optic receptacle 36. FIG. 5B illustrates the connector shroud 66 installed on the ferrule 32 and mounted to the PCB 24 to provide the fiber optic receptacle 36 of the PCB assembly 20. With reference to FIG. 5A, the connector shroud 66 provides the front coupling face 50 of the ferrule 32 and provides alignment features that alignably receive the ferrule 68 of the fiber optic plug 64. The connector shroud 66 aligns the optical interfaces 70 of the fiber optic plug 64 with the optical interfaces 28 of the fiber optic receptacle 36. The connector shroud 66 in this example is comprised of an outer body 101 with a channel 102 disposed therein. The channel 102 is sized to receive the ferrule 32. The connector shroud 66 receives the ferrule 32 through a rear opening 104 of the connector shroud 66 disposed at a rear end 106 of the connector shroud 66. The connector shroud 66 also includes side slots 108A, 108B of length $D_3$ and width $W_2$. The side slots 108A, 108B are provided in the sides 110A, 110B of the connector shroud 66 and are sized in length and width to allow the connector shroud 66 to slide back onto the PCB post 86. As illustrated in FIG. 5B, side slots 108A, 108B also receive portions 100A, 100B of the PCB 24 to allow the rear end 106 of the connector shroud 66 to be mounted to the PCB 24. The front coupling face 50 of the ferrule 32 is aligned to a front opening 112 disposed at a front end 114 of the connector shroud 66, to place the front coupling face 50 of the ferrule 32 in a known, fixed location with respect to the front opening 112 of the connector shroud 66. The connector shroud 66 also includes curved plug receiving alignment tabs 116 to receive and align the fiber optic plug 64 (FIG. 4A) to the fiber optic receptacle 36.

Figure 7B:
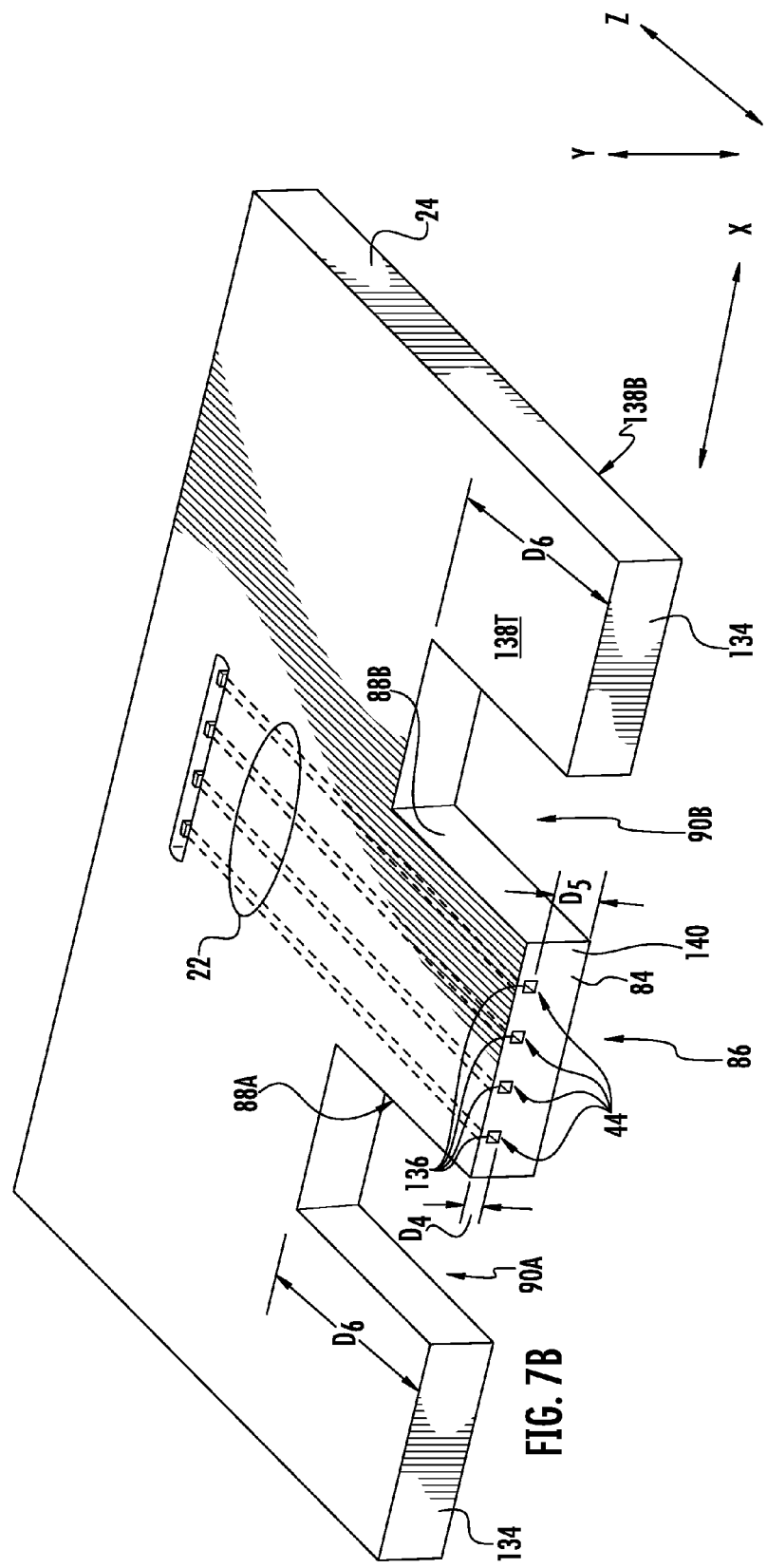
FIG. 7B is a front side, perspective view of the PCB of the PCB assembly in FIG. 7A after the alignment slots for aligning the fiber optic connector have been disposed into the PCB.

FIG. 6 is a flowchart illustrating an exemplary process 120 for assembling the PCB assembly 20 in FIGS. 5A and 5B. The exemplary process 120 for assembling the PCB assembly 20 in FIG. 6 will be described in conjunction with FIGS. 7A-7E. FIGS. 7A-7E illustrate various phases of the assembly of the PCB assembly 20. In this regard, with reference to FIG. 6, a first exemplary step in assembling the PCB assembly 20 is to provide the PCB 24 having one or more inter-board optical fiber traces 22 disposed therein (block 122). The end portions 44 of the inter-board optical fiber traces 22 are exposed through the end surface 84 of the PCB 24 to allow for optical connection to the inter-board optical fiber traces 22 (block 124). The exposed end portions 44 of the inter-board optical fiber traces 22 form an end surface 134 of the PCB 24 as illustrated in FIG. 7A. For example, a larger PCB having the inter-board optical fiber traces 22 may be cut into smaller PCBs 24 for providing PCB assemblies 20. The cutting of the PCB 24 an be provided to expose the end portions 44 of the inter-board optical fiber traces 22 from the end surface 84 of the PCB 24, as illustrated in FIG. 7A. The end portions 44 of the inter-board optical fiber traces 22 illustrated in FIG. 7A may be prepared, including but not limited to polished, to provide the end portions 44 as having planar or substantially planar end faces 136.

With reference back to FIG. 6, the process 120 of assembling the PCB assembly 20 may also optionally include providing the alignment slots 90A, 90B in the PCB 24 after the surface-exposed end portions 44 of the inter-board optical fiber traces 22 are exposed through the end surface 134 of the PCB 24, as illustrated in FIG. 7B (block 126 in FIG. 6). The alignment slots 90A, 90B may be cut into the PCB 24. The cutting of the alignment slots 90A, 90B in the PCB 24 provide the PCB post 86 and end surface 84 portion of the end surface 134, as illustrated in FIG. 7B, and as previously described and illustrated in FIG. 5A. The cutting of the alignment slots 90A, 90B in the PCB 24 also forms the alignment surfaces 88A, 88B, as illustrated in FIG. 7B, and as previously described and illustrated in FIG. 5A. The alignment slots 90A, 90B are disposed into the PCB 24 so that the desired distance is provided between the alignment surfaces 88A, 88B and the ferrule 32, when installed on the PCB post 86. In this manner, the surface-exposed end portions 44 of the inter-board optical fiber traces 22 are disposed in an aligned lateral axis X with respect to the rear end portions 38 of the optical interfaces 28 of the ferrule 32 (FIG. 3) for optical connection to the end portions 44 of the inter-board optical fiber traces 22.

With continuing reference to FIG. 7B, a top surface 138T and/or a bottom surface 138B of the PCB 24 provide data (i.e., datum) for alignment of the end portions 44 of the inter-board optical fiber traces 22 to rear end portions 38 of the optical interfaces 28 of the ferrule 32 (FIG. 3) in a height axis Y. The top surface 138T and/or a bottom surface 138B of the PCB 24 could provide datum for alignment in addition to or in lieu of the PCB post 86 and alignment slots 90A, 90B. The inter-board optical fiber traces 22 are provided in the PCB 24 in a known distance $D_4$ from the top surface 138T and distances $D_5$ from the bottom surface 138B of the PCB 24 to provide data for alignment in the height axis Y. The depth $D_6$ of the alignment slots 90A, 90B provide alignment of the rear end portions 38 of the optical interfaces 28 of the ferrule 32 (FIG. 3) in a depth axis Z to control the distance between the rear end portions 38 of the optical interfaces 28 of the ferrule 32 optically connected to the surface-exposed end portions 44 of the inter-board optical fiber traces 22, as illustrated by example in FIG. 2. In the example of the PCB assembly 20 in FIG. 2, the rear end portions 38 of the optical interfaces 28 of the ferrule 32 are brought into physical contact with the end portions 44 of the inter-board optical fiber traces 22. This contact assists in displacing liquid present on rear end portions 38 of the optical interfaces 28 and/or end portions 44 of the inter-board optical fiber traces 22 when the PCB assembly 20 is assembled, because the rear end portions 38 of the optical interfaces 28 and the end portions 44 of the inter-board optical fiber traces 22 are planar-shaped in this example. As a non-limiting example, the rear end portions 38 of the optical interfaces 28 may be disposed a distance between zero (0) and three hundred (300) μm away from the end portions 44 of the inter-board optical fiber traces 22

Figure 7C:
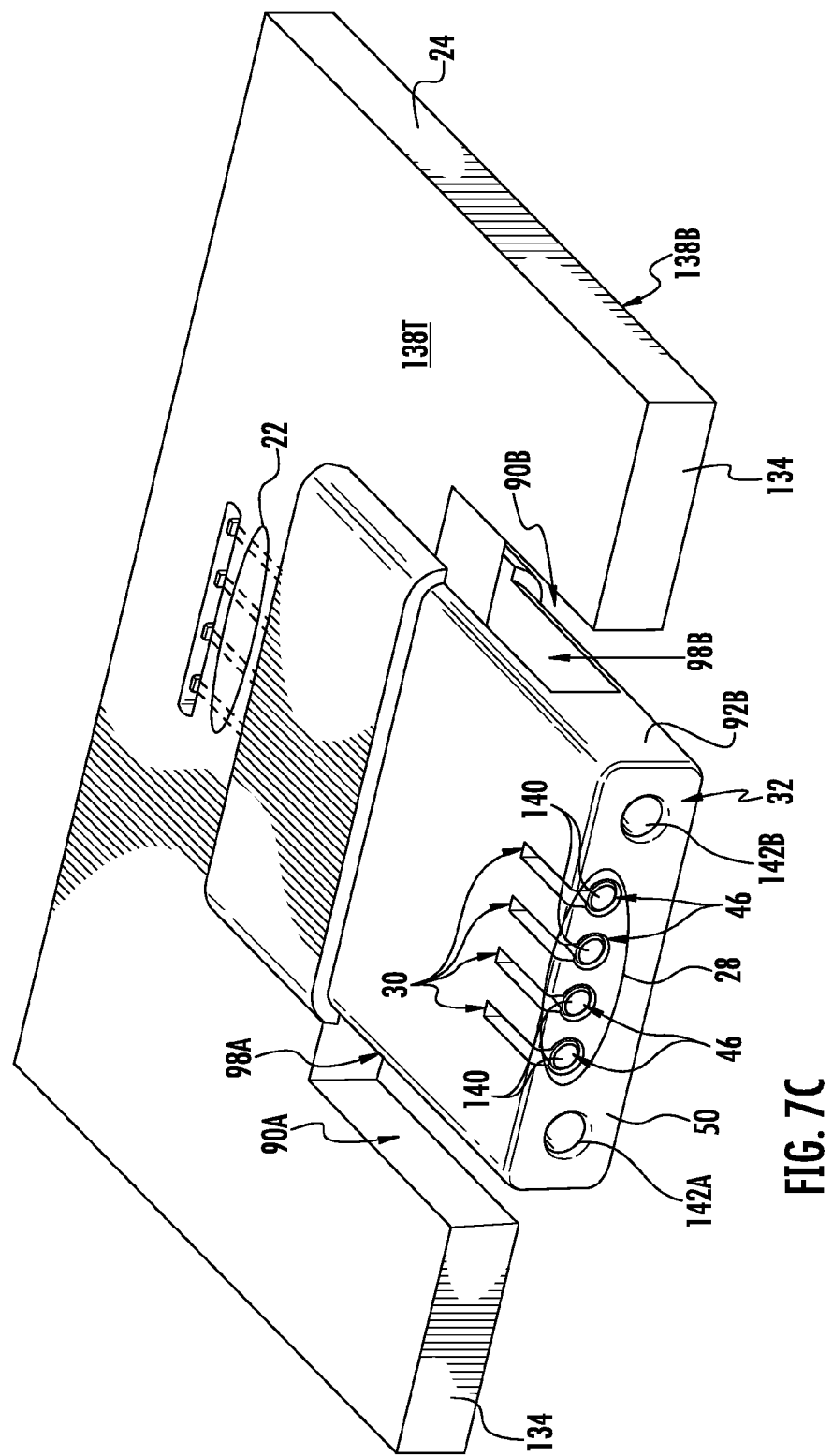
FIG. 7C is a front side, perspective view of the ferrule of the fiber optic connector of the PCB assembly in FIGS. 5A and 5B mounted on the PCB post formed by alignment slots disposed into the PCB illustrated in FIG. 7B, to optically connect the end portions of the surface-accessible, planar-shaped inter-board optical fiber traces.
Figure 7D:
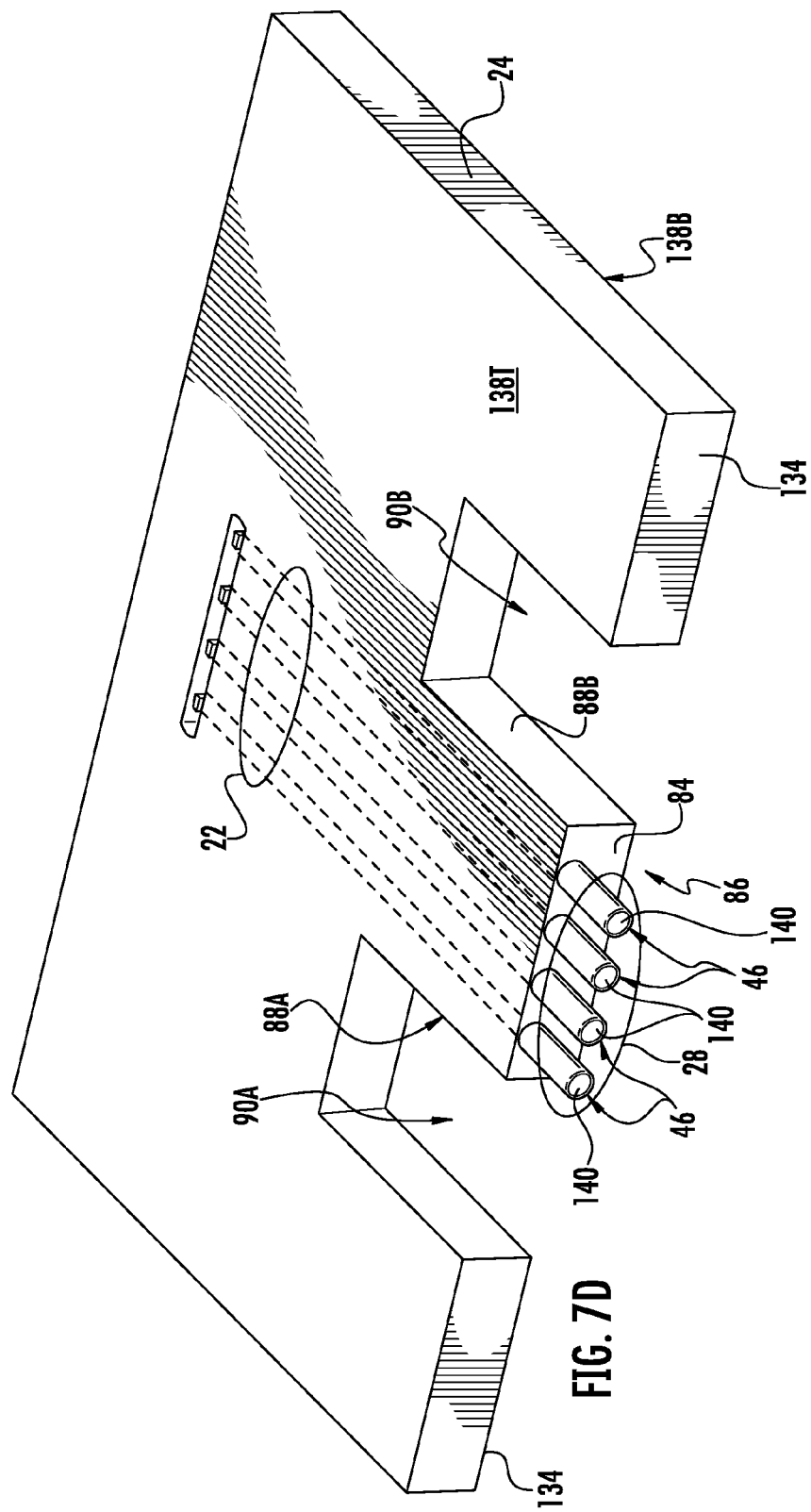
FIG. 7D is front side, perspective view of the PCB in FIG. 7C, with the plurality of optical interfaces in the form of GRIN lenses without the ferrule shown, the plurality of optical interfaces aligned to inter-board optical fiber traces.

With reference back to FIG. 6, the process of assembling the PCB assembly 20 in this example next includes mounting the ferrule 32 to the PCB 24 (block 128). In this regard, FIG. 7C is a front side, perspective view of the ferrule 32 in the process of being mounted on the PCB post 86 into the PCB 24 to optically connect the rear end portions 38 of the optical interfaces 28 to the end portions 44 of the inter-board optical fiber traces 22. FIG. 7D is front side, perspective view of the PCB 24 in FIG. 7C, with the optical interfaces 28 shown without being disposed in the ferrule 32, shown aligned to inter-board optical fiber traces 22. The rear end portions 38 of the optical interfaces 28 (FIG. 3) may be prepared, including but not limited to polished, to provide planar or substantially planar end faces. The front end portions 46 of the optical interfaces 28 may also be prepared, including but not limited to polished, to provide planar or substantially planar end faces 140. The ferrule 32 may include alignment receptacles 142A, 142B, as illustrated in FIG. 7C, that are configured to receive alignment posts from the fiber optic plug 64 to align the fiber optic receptacle 36 and fiber optic plug 64.

Figure 7E:
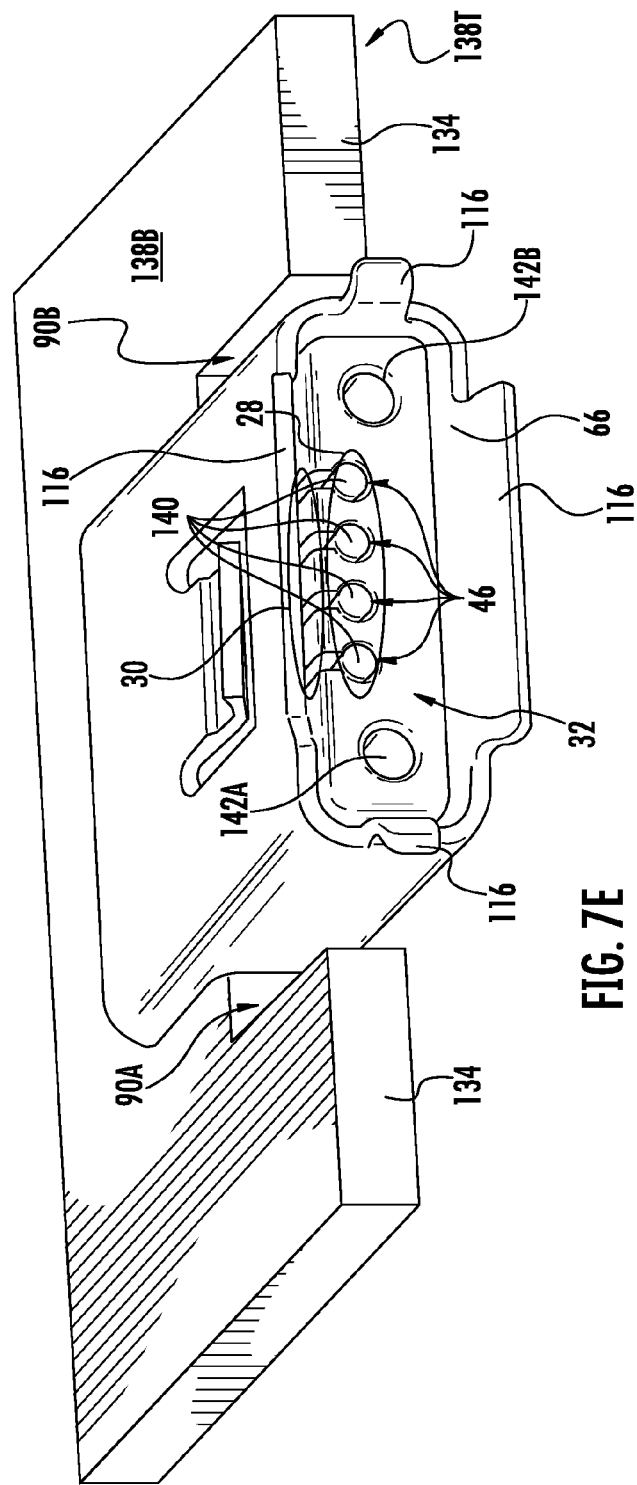
FIG. 7E is a bottom, front side, perspective view of a connector shroud disposed around the ferrule and mounted in the alignment slots disposed into the PCB in FIG. 7C to provide the assembled fiber optic connector of the PCB assembly in FIGS. 5A and 5B.

With reference back to FIG. 6, after the ferrule 32 is mounted to the PCB post 86 on the PCB 24, the connector shroud 66 can also be mounted on the ferrule 32 and the PCB 24, as previously described with regard to FIG. 5A, to provide the fiber optic receptacle 36 on the PCB 24 to complete the PCB assembly 20 (block 130). This is illustrated by example in FIGS. 7E and 7F. FIG. 7E is a bottom, front side, perspective view of a connector shroud 66 disposed around the ferrule 32 and mounted in the alignment slots 90A, 90B disposed into the PCB 24 in FIG. 7C to provide the assembled fiber optic receptacle 36 mounted on the PCB assembly 20. FIG. 7F is a top perspective view of the assembled fiber optic receptacle 36 mounted to the PCB 24 to provide the PCB assembly 20.

Figure 7G:
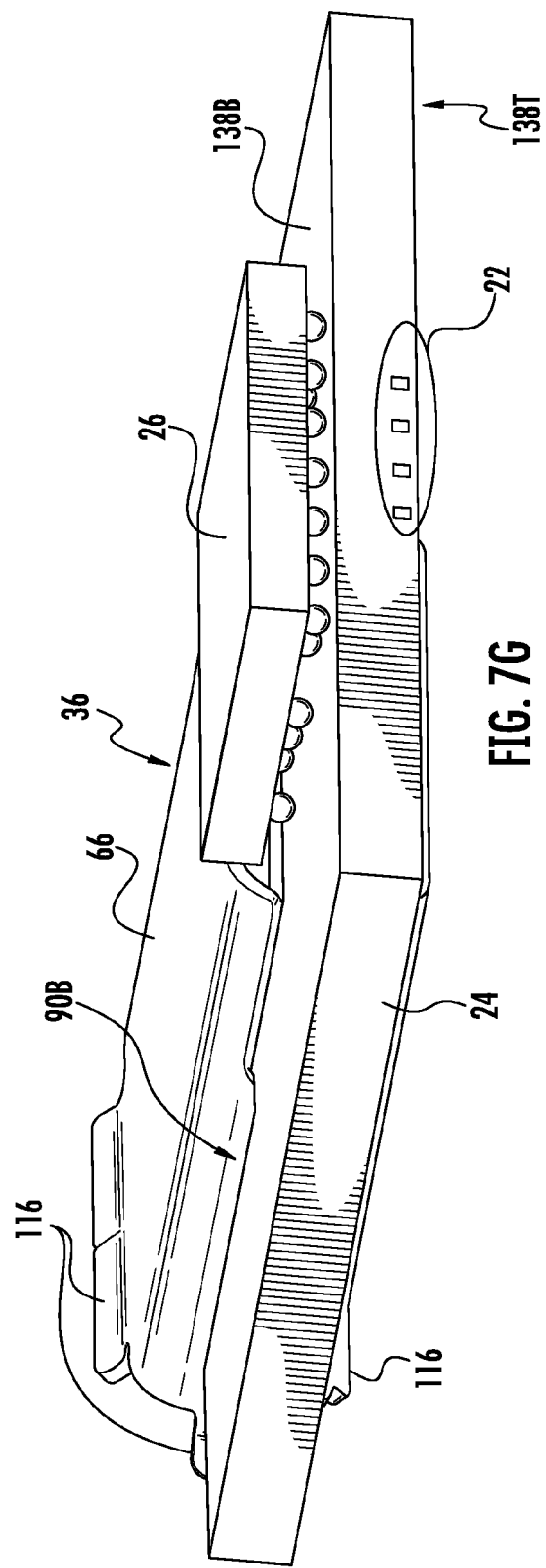
FIG. 7G is a bottom side, perspective view of an active optical component mounted to the PCB in FIGS. 7E and 7F to provide the PCB assembly in FIGS. 5A and 5B.

With reference back to FIG. 6, the active optical component 26 can be mounted to the PCB 24 during any part of the assembly process for the PCB assembly 20 after the PCB 24 is provided (block 132). In this regard, FIG. 7G is a bottom side, perspective view of an active optical component 26 mounted to the PCB 24 in order to provide the PCB assembly 20 in FIGS. 5A and 5B. As previously discussed and illustrated in FIGS. 5A and 5B, the PCB assembly 20 optically connects the active optical component 26 to the optical interfaces 28 in the fiber optic receptacle 36 via the inter-board optical fiber traces 22.

Figure 8B:
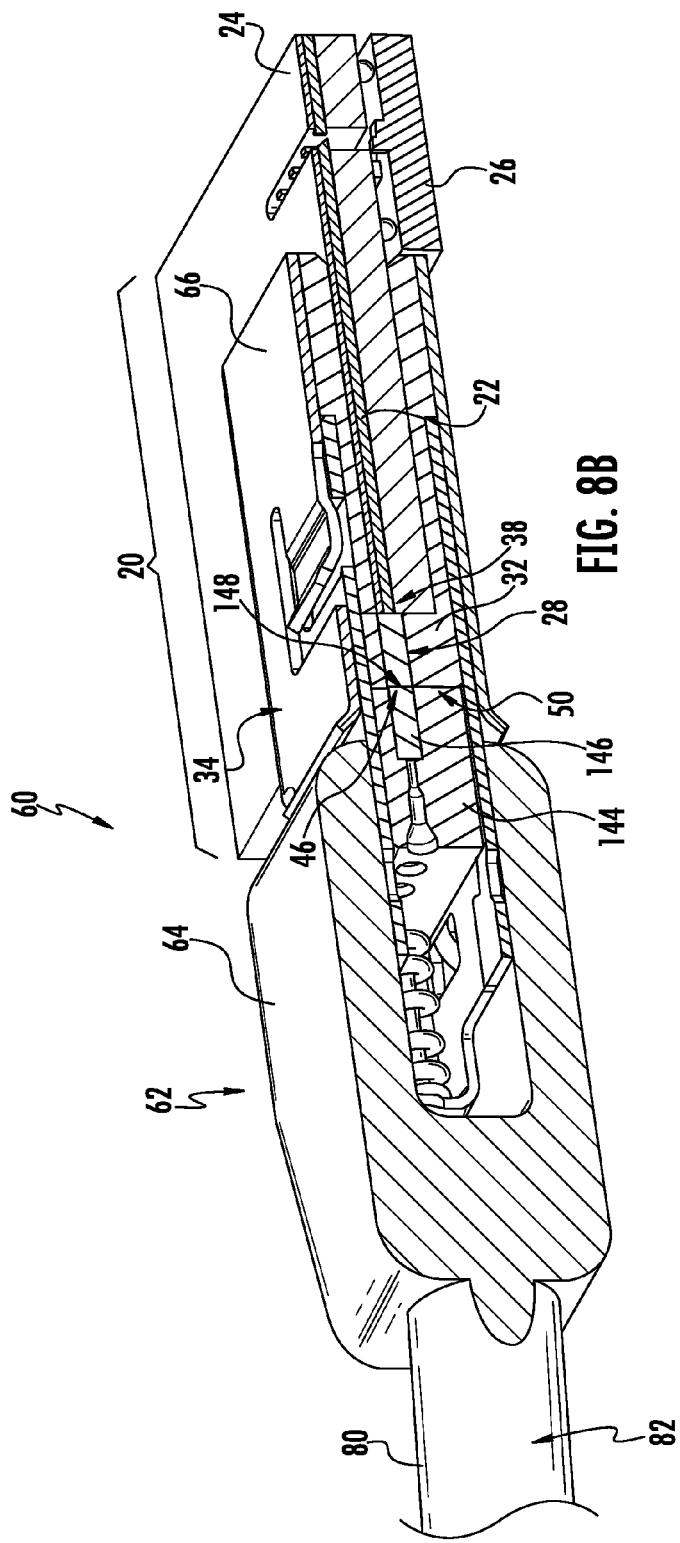
FIG. 8B is a rear side, perspective cross-sectional view of the fiber optic receptacle of the PCB assembly receiving the fiber optic connector in FIG. 8A.

FIG. 8A is a rear side, perspective view of the fiber optic receptacle 36 of the PCB assembly 20 in FIGS. 5A and 5B receiving the fiber optic plug 64 of the connectorized fiber optic cable 80 to optically connect the surface-accessible, planar-shaped optical interfaces 28 of the fiber optic receptacle 36 to the surface-accessible, planar-shaped inter-board optical fiber traces 22 in the PCB 24. FIG. 8B is a rear side, perspective cross-sectional view of the fiber optic receptacle 36 of the PCB assembly 20 receiving the fiber optic plug 64 in FIG. 8A. As illustrated in FIG. 8B, a ferrule 144 of the fiber optic plug 64 also has GRIN lenses 146 that have planar-shaped front end faces 148 configured to be disposed in optical contact with the front end portions 46 of the optical interfaces 28 disposed in a front coupling face 50 of the ferrule 32. By the GRIN lenses 146 having planar-shaped front end faces 148, the planar-shaped front end faces 148 may be capable of displacing or substantially displacing liquid when the fiber optic plug 64 is received in the fiber optic receptacle 36. This may reduce the risk of optical attenuation occurring from liquid disposed on the planar-shaped front end faces 148 of the fiber optic plug 64 or the front end portions 46 of the optical interfaces 28 of the fiber optic receptacle 36, prior to the fiber optic plug 64 being received in the fiber optic receptacle 36. Note that the ferrule 144 of the fiber optic plug 64 may support other types of optical components other than the GRIN lenses 146. For example, the ferrule 144 of the fiber optic plug 64 may support refractive or diffractive lenses, as non-limiting examples.

Other embodiments of PCB assemblies that include PCBs employing optical interfaces optically connected to surface-accessible, planar-shaped inter-board optical fiber traces disposed in the PCB can be provided. In this regard, FIG. 9 is a side perspective view of another exemplary PCB assembly 20(2). The PCB assembly 20(2) can be included in an electronics device to support electronic components. The PCB assembly 20(2) in FIG. 9 includes the PCB 24 having inter-board optical fiber traces 22 previously described above.

Figure 10:
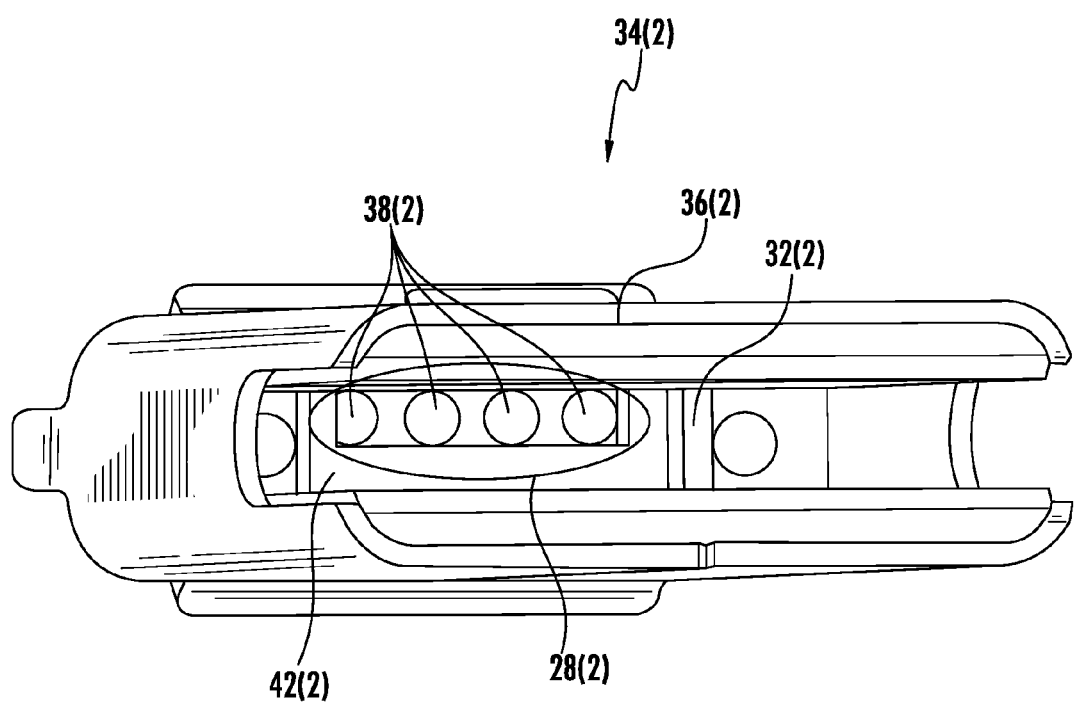
FIG. 10 is a rear side, perspective view of the PCB assembly in FIG. 9.

With continuing reference to FIG. 9, to provide for an external fiber optic cable to establish an optical connection with the inter-board optical fiber traces 22 and active optical components 26, optical interfaces 28(2) are included in the PCB assembly 20(2). The optical interfaces 28(2) are integrated into a ferrule 32(2) in this embodiment, as opposed to being provided separately disposed in channels of a ferrule, as provided in the PCB assembly 20 described above. As will be described in more detail below, the optical interfaces 28(2) are included as light transmissive material portions in the form of lenses in the ferrule 32(2) in this embodiment. For example, the optical interfaces 28(2) may be provided as part of a single piece mold of the ferrule 32(2). No openings in the ferrule 32(2) are needed for the optical interfaces 28(2). The ferrule 32(2) is mounted to the PCB 24 in this example. The ferrule 32(2) is provided as part of a fiber optic connector 34(2) in the form of a fiber optic receptacle 36(2) in this example. Rear end portions 38(2) of the optical interfaces 28(2) are provided in a rear coupling face 42(2) (or rear mating face 42(2)) of the ferrule 32(2) to be surface-accessible, as illustrated in the rear side, perspective view of the assembled fiber optic receptacle 36(2) in FIG. 10. In this embodiment, the rear end portions 38(2) of the optical interfaces 28(2) are either substantially planar-shaped or curved. The rear end portions 38(2) of the optical interfaces 28(2) may be prepared, including but not limited to polished, to provide end faces.

With reference back to FIG. 9, when the ferrule 32(2) is installed on the PCB 24, the rear end portions 38(2) of the optical interfaces 28(2) are placed in close proximity to planar-shaped end portions 44 of the inter-board optical fiber traces 22 that are surface-accessible from the PCB 24. For example, the rear end portions 38(2) of the optical interfaces 28(2) may be placed to within zero (0) to three hundred (300) µm from each other, as a non-limiting example. In this manner, when a fiber optic cable (not shown) is connected to the fiber optic receptacle 36(2), an optical connection is established between optical fibers in the fiber optic cable to front end portions 46(2) of the optical interfaces 28(2) disposed in a front coupling face 50(2) (or front mating face 50(2)) of the ferrule 32(2). The front end portions 46(2) of the optical interfaces 28(2) may be prepared, including but not limited to polished, to provide end faces. This optical connection provides an optical connection to the planar-shaped end portions 44 of the inter-board optical fiber traces 22, which in turn, provides an optical connection to the active optical components 26 on the PCB 24. The optical connection path between the active optical components 26 and the front end portions 46(2) of the optical interfaces 28(2) is shown by the optical path 52 in FIG. 9. A total internal reflection (TIR) surface 54 is employed to direct light from a longitudinal axis $A_2$ of the inter-board optical fiber traces 22 and free space 56 disposed in the PCB 24 between the inter-board optical fiber traces 22 and the active optical components 26.

In this example of the PCB assembly 20(2) in FIG. 9, with the end portions 38(2) of the optical interfaces 28(2) not placed in direct contact with the planar-shaped end portions 44 of the inter-board optical fiber traces 22, an index-matching adhesive 49(2) may be disposed therebetween. The index-matching adhesive 49(2) provides the optical connection without the optical signal traveling through air between the end portions 38(2) of the optical interfaces 28(2) and the planar-shaped end portions 44 of the inter-board optical fiber traces 22. This may avoid contaminate substances, such as liquid or other substances that can cause optical attenuation, from being disposed between the rear end portions 38(2) of the optical interfaces 28(2) in optical contact to planar-shaped end portions 44 of the inter-board optical fiber traces 22.

With continuing reference to FIG. 9, by providing rear end portions 38(2) of the optical interfaces 28(2) and the end portions 44 of the inter-board optical fiber traces 22 as planar-shaped end portions, liquid disposed on either the optical interfaces 28(2) or the inter-board optical fiber traces 22 can be displaced or substantially displaced during assembly of the PCB assembly 20(2). Liquid disposed on either the end portions 38(2) of the optical interfaces 28(2) and the end portions 44 of the inter-board optical fiber traces 22 can cause optical attenuation. Liquid may be disposed on the end portions 38(2) of the optical interfaces 28(2) and the end portions 44 of the inter-board optical fiber traces 22 for a number of reasons. For example, solder from wave soldering PCB processes may be disposed on the end portions 38(2) of the optical interfaces 28(2) and the end portions 44 of the inter-board optical fiber traces 22. Also, because the optical interfaces 28(2) are provided as an integrated part of the ferrule 32(2) without openings, liquid is not able to flow through any openings inside the ferrule 32(2) and contaminate inside portions of the ferrule 32(2).

Further, liquid introduced during use of an electronic device incorporating the PCB assembly 20(2), can be displaced by the end portions 38(2) of the optical interfaces 28(2) and the planar-shaped end portions 44 of the inter-board optical fiber traces 22. Liquid posed on a planar-shaped surface tends to be displaced when placed into contact with another planar-shaped surface. Liquids present on either optically transmissive end portion of an optical fiber or lens are displaced (i.e., spread-out) upon coupling. In some embodiments, end portions 38(2) of the optical interfaces 28(2) and/or the end portions 44 of the inter-board optical fiber traces 22 may be coated with a coating or otherwise treated such that it is hydrophobic, and any liquid present thereon is easily displaced, thereby reducing the lens affect for any liquid present. Other coatings or treatments may be applied, such as chemical strengthening, anti-reflection, lamination, diffractive, and hydrophilic coatings as desired.

Figure 11:
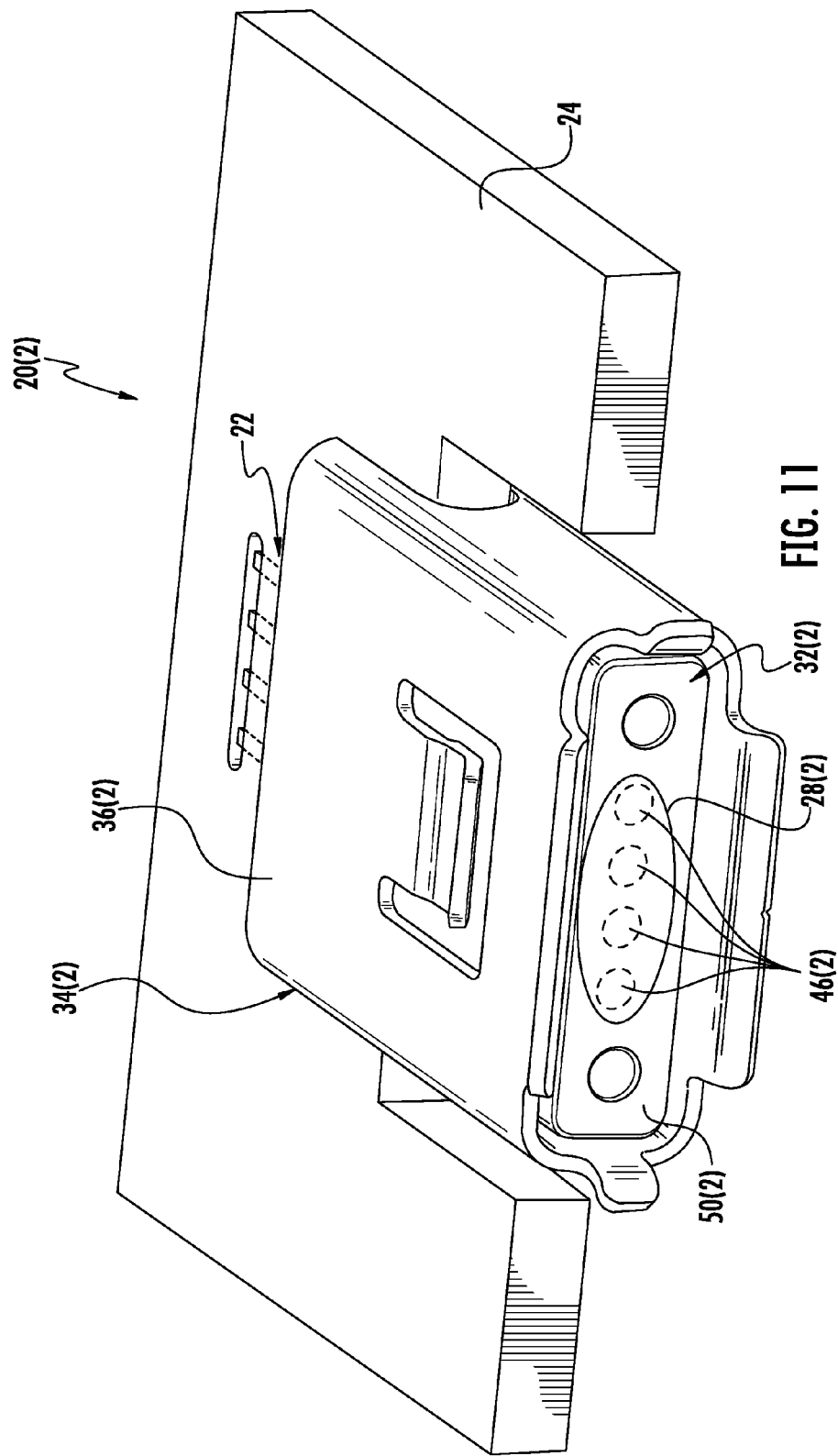
FIG. 11 is a front side, perspective view of the PCB assembly of FIG. 10.

FIG. 11 is a front side, perspective view of a fully assembled PCB assembly 20(2) of FIG. 9. The optical interfaces 28(2) of the fiber optic receptacle 36(2) are provided to establish optical connections to the active optical components 26 (not shown) on the PCB 24 via the inter-board optical fiber traces 22. In this regard, the fiber optic receptacle 36(2) of the PCB assembly 20(2) is configured to receive an exemplary fiber optic connector, such as fiber optic plug 64 illustrated in FIG. 4A discussed above as an example. The fiber optic receptacle 36(2) includes a connector shroud 66(2), which is made from a metal material in this embodiment, to receive a fiber optic plug and optically connect a fiber optic plug to the optical interfaces 28(2) of the fiber optic receptacle 36(3).

Figure 12:
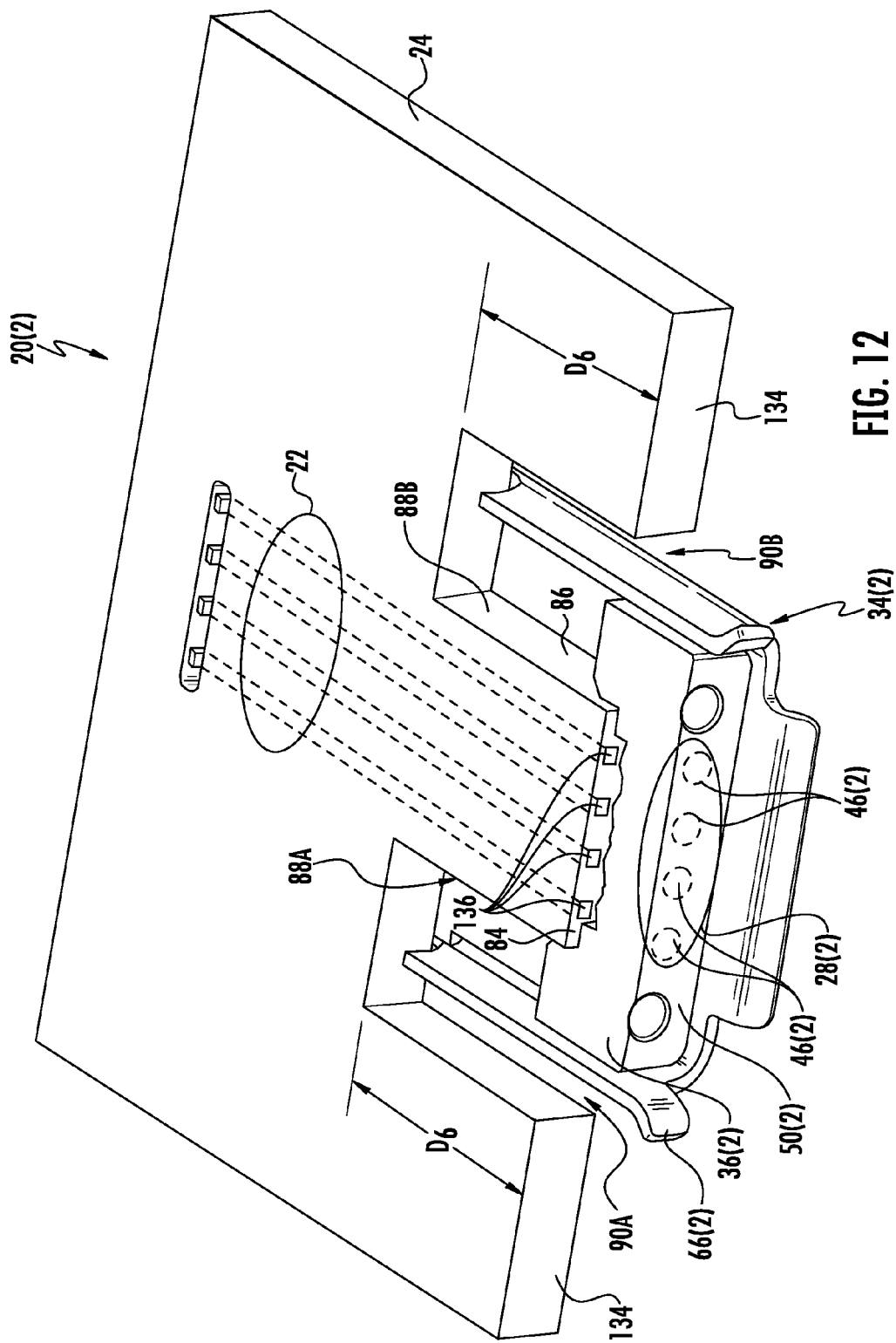
FIG. 12 is a front side, perspective view of the PCB assembly of FIG. 10, with the connector shroud and ferrule cut away to show the PCB post of the PCB assembly.

FIG. 12 is front side, perspective view of the PCB assembly 20(2) in FIG. 11, with the connector shroud 66(2) and ferrule 32(2) of the fiber optic receptacle 34(2) cut away to show the relationship of the connector shroud 66(2) and ferrule 32(2)

to the PCB 24. The optical interfaces 28(2) in the ferrule 32(2) are aligned to the inter-board optical fiber traces 22 in the PCB 24.

Figure 13:
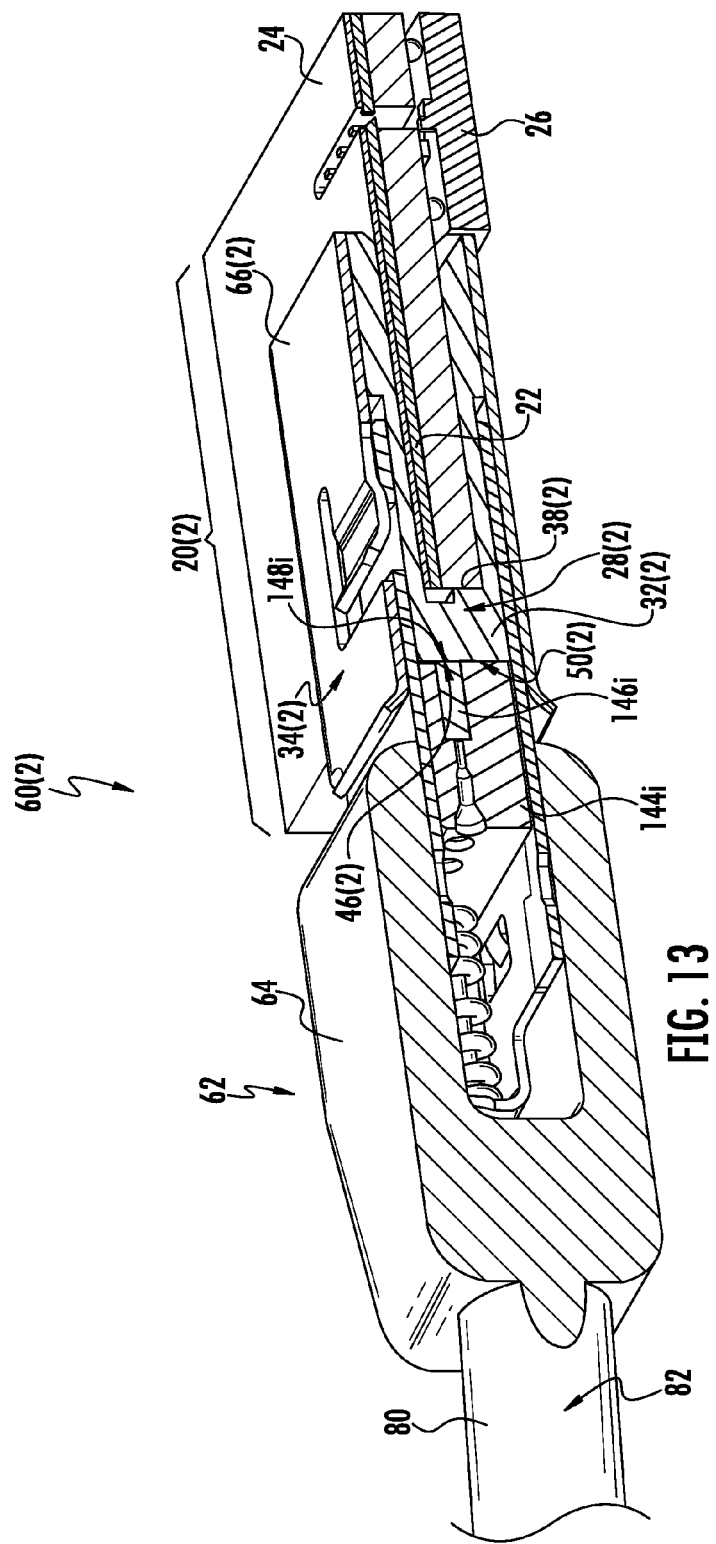
FIG. 13 is a rear side, perspective cross-sectional view of the fiber optic receptacle of the PCB assembly receiving the fiber optic connector in FIG. 9.

FIG. 13 is a rear side, perspective cross-sectional view of the fiber optic receptacle 36(2) of the PCB assembly 20(2) receiving the fiber optic plug 64 in FIG. 8B. As illustrated in FIG. 13, the ferrule 144 of the fiber optic plug 64 has GRIN lenses 146 that have planar-shaped front end faces 148 configured to be disposed in optical contact with the front end portions 46(2) of the optical interfaces 28(2) disposed in a front coupling face 50(2) of the ferrule 32(2). By the GRIN lenses 146 having planar-shaped front end faces 148, the planar-shaped front end faces 148 may be capable of displacing or substantially displacing liquid when the fiber optic plug 64 is received in the fiber optic receptacle 36(2). This may reduce the risk of optical attenuation occurring from liquid disposed on the planar-shaped front end faces 148 of the fiber optic plug 64 or the front end portions 46(2) of the optical interfaces 28(2) of the fiber optic receptacle 36(2), prior to the fiber optic plug 64 being received in the fiber optic receptacle 36(2). Again, the ferrule 144 of the fiber optic plug 64 may support other types of lenses other than the GRIN lenses 146 (e.g., refractive or diffractive lenses).

Figure 14:
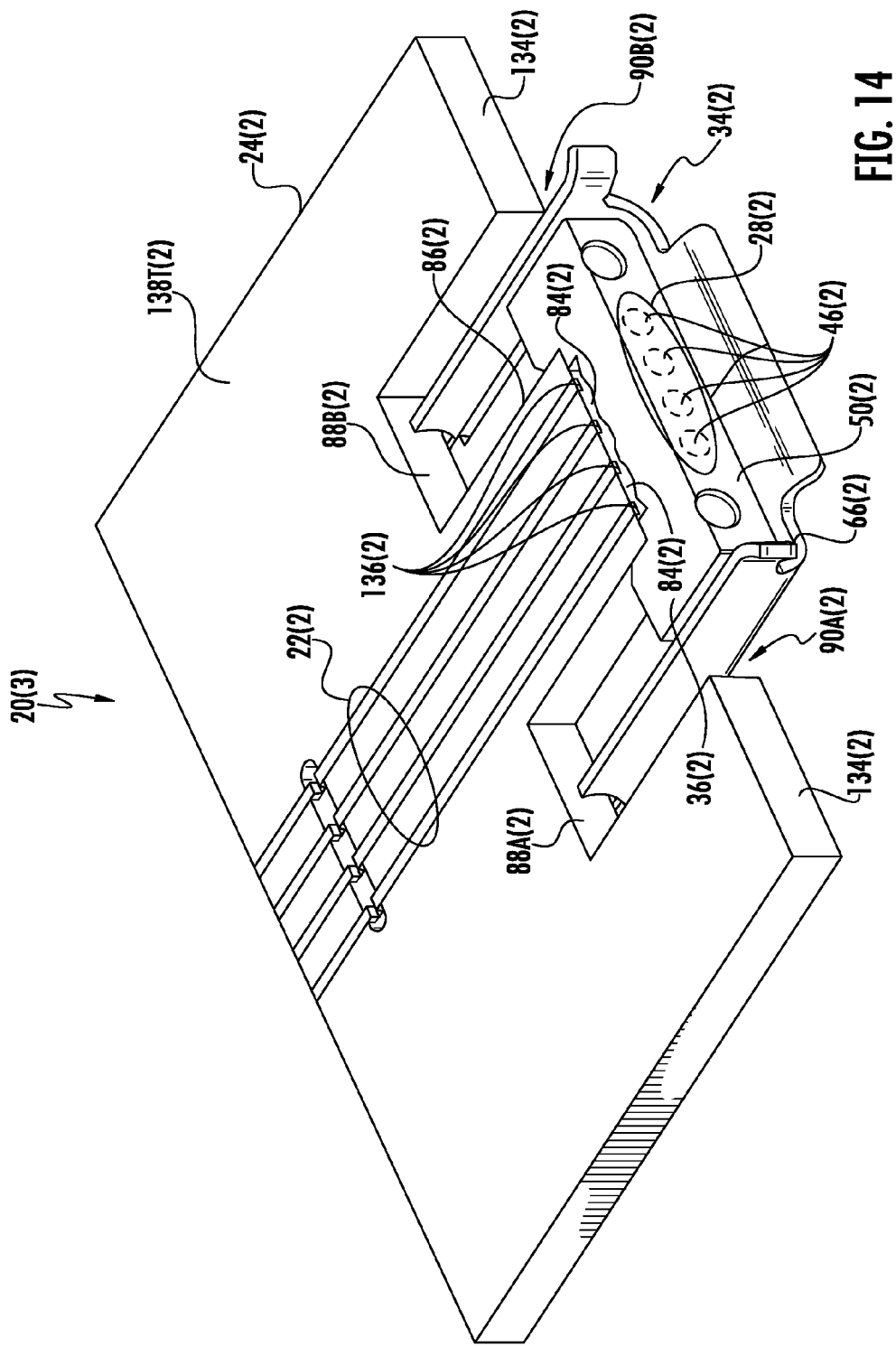
FIG. 14 is a front side, perspective view of an alternative PCB assembly to the PCB assembly in FIG. 10, the alternative PCB assembly having alternative inter-board optical fiber traces with the connector shroud and ferrule cut away to show the PCB post of the PCB assembly.

The discussion above regarding the PCB 24 is applicable here in this embodiment. The inter-board optical fiber traces 22 are shown disposed in the PCB 24 with end faces 136 exposed and surface-accessible. However, alternative PCB arrangements are possible that can be employed in the PCB assemblies 20, 20(2) described herein. For example, FIG. 14 illustrates a front side, perspective view of a PCB assembly 20(3) similar to the PCB assembly 20(2) in FIG. 11, with the connector shroud 66(2) and ferrule 32(2) of the fiber optic receptacle 34(2) cut away. However, an alternative PCB 24(2) is provided. In this PCB 24(2), the inter-board optical fiber traces 22(2) are embedded in a different manner in the PCB 24(2) from the PCB 24. The inter-board optical fiber traces 22(2) are embedded and are surface accessible from an end surface 84(2) and a top surface 138T(2) of the PCB 24(2). In this regard, the optical interfaces 28(2) and/or the ferrule 32(2) is provided such that the end portions 38(2) of the optical interfaces 28(2) optically align with end faces 136(2) of the inter-board optical fiber traces 22(2).

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A circuit board assembly, comprising:
   a circuit board comprising at least one inter-board optical fiber trace having at least one planar-shaped end portion accessible through an end surface of the circuit board; and
   at least one optical interface disposed in a ferrule, the at least one optical interface comprising a front end portion and a rear end portion, where the front end portion comprises a lens that is accessible through a coupling face of the ferrule;
   the at least one optical interface of the ferrule alignably mounted on the circuit board to optically connect the rear end portion of the at least one optical interface to the at least one planar-shaped end portion of the at least one inter-board optical fiber trace of the circuit board.

2. The circuit board assembly of claim 1, wherein the rear end portion of the at least one optical interface contacts the at least one planar-shaped end portion of the at least one inter-board optical fiber trace of the circuit board.

3. The circuit board assembly of claim 1, wherein the rear end portion of the at least one optical interface is disposed within at least three hundred (300) micrometers (μm) to at least one planar-shaped end portion of the at least one inter-board optical fiber trace of the circuit board.

4. The circuit board assembly of claim 1, further comprising index matching adhesive disposed between the rear end portion of the at least one optical interface and the at least one planar-shaped end portion of the at least one inter-board optical fiber trace of the circuit board.

5. The circuit board assembly of claim 1, wherein the rear end portion of the at least one optical interface comprises at least one planar-shaped end portion.

6. The circuit board assembly of claim 1, wherein the ferrule comprises a gradient index (GRIN) lens holder, and at least one optical interface is comprised of at least one GRIN lens disposed in the GRIN lens holder.

7. The circuit board assembly of claim 1, wherein the at least one optical interface is comprised of at least one light transmissive material integrated into the ferrule.

8. The circuit board assembly of claim 1, further comprising at least one datum disposed in the circuit board configured to align with at least one complementary portion of the ferrule to alignably mount the at least one optical interface on the circuit board.

9. The circuit board assembly of claim 1, further comprising at least one alignment slot disposed in the circuit board configured to receive a complementary portion of the ferrule to alignably mount the at least one optical interface on the circuit board.

10. The circuit board assembly of claim 9, wherein the at least one alignment slot in the circuit board forms at least one mating surface in the circuit board, the at least one mating surface configured to mate with a side surface of the ferrule to alignably mount the at least one optical interface on the circuit board.

11. The circuit board assembly of claim 9, wherein the at least one alignment slot disposed in the circuit board is comprised of two alignment slots disposed in the circuit board to form an optical fiber trace circuit board post disposed between the two alignment slots, at least a portion of the at least one inter-board optical fiber trace disposed in the optical fiber trace circuit board post, and the at least one planar-shaped end portion of the at least one inter-board optical fiber trace disposed on an end surface of the optical fiber trace circuit board post.

12. The circuit board assembly of claim 1, further comprising at least one active optical component mounted to the circuit board and optically connected to the at least one inter-board optical fiber trace.

13. The circuit board assembly of claim 1, wherein the at least one optical interface comprises a fiber optic receptacle.

14. The circuit board assembly of claim 1, wherein the at least one optical interface comprises a fiber optic plug.

15. The circuit board assembly of claim 1, further comprising a totally internally reflected (TIR) surface disposed in the ferrule in a first optical axis of the at least one optical interface, the TIR surface configured to TIR reflect light in the first optical axis.

16. A method of preparing a circuit board assembly, comprising:
providing a circuit board comprising at least one inter-board optical fiber trace;
exposing at least one end portion of the at least one inter-board optical fiber trace through an end surface of the circuit board to provide at least one surface-accessible, planar-shaped end portion of the at least one inter-board optical fiber trace;
mounting a ferrule comprising at least one optical interface to the circuit board, the at least one optical interface comprising a front end portion and a rear end portion; and
optically connecting rear end portion of the at least one optical interface of the ferrule to the at least one planar-shaped end portion of the at least one inter-board optical fiber trace of the circuit board, and the front end portion comprising a lens being accessible through a coupling face of the ferrule.

17. The method of claim 16, further comprising optically connecting the rear end portion of the at least one optical interface in physical contact with the at least one planar-shaped end portion of the at least one inter-board optical fiber trace of the circuit board.

18. The method of claim 16, further comprising optically connecting the rear end portion of the at least one optical interface within three hundred (300) micrometers (μm) of the at least one planar-shaped end portion of the at least one inter-board optical fiber trace of the circuit board.

19. The method of claim 16, wherein the at rear end portion of the at least one optical interface is planar-shaped.

20. The method of claim 16, wherein mounting the at least one optical interface to the circuit board further comprises aligning at least one datum disposed in the circuit board receiving at least one complementary portion of the ferrule.

21. The method of claim 16, further comprising providing at least one alignment slot in the circuit board;
wherein mounting the ferrule to the circuit board further comprises mounting the ferrule about the at least one alignment slot disposed in the circuit board to optically connect the rear end portion of the at least one optical interface to the at least one planar-shaped end portion of the at least one inter-board optical fiber trace of the circuit board.

22. The method of claim 16, further comprising mounting at least one active optical component to the circuit board to optically connect the at least one active optical component to the at least one inter-board optical fiber trace.

23. An electro-optical connection assembly, comprising:
an electronic device, comprising:
a circuit board comprising at least one inter-board optical fiber trace having at least one first planar-shaped end portion accessible through an end surface of the circuit board, and at least one second planar-shaped end portion optically connected to at least one optical interface device optically interfaced to at least one electronic component disposed on the circuit board;
a first fiber optic connector comprising a ferrule comprising at least one optical interface disposed in a ferrule, the at least one optical interface comprising a rear end portion and a front end portion, the front end portion comprising a lens being accessible through a coupling face of the ferrule, the ferrule alignably mounted on the circuit board to optically connect the rear end portion of the at least one optical interface to the at least one first planar-shaped end portion of the at least one inter-board optical fiber trace of the circuit board; and
a second fiber optic connector of a fiber optic cable mated to the first fiber optic connector of the electronic device to optically connect at least one optical fiber of the fiber optic cable to the front end portion of the ferrule.

24. The electro-optical connection assembly of claim 23, wherein the rear end portion of the at least one optical interface is disposed in contact to at least one first planar-shaped end portion of the at least one inter-board optical fiber trace of the circuit board.

25. The circuit board assembly of claim 23, further comprising index matching adhesive disposed between the rear end portion of the at least one optical interface and the at least one planar-shaped end portion of the at least one inter-board optical fiber trace of the circuit board.

26. The circuit board assembly of claim 23, wherein the rear end portion of the at least one optical interface comprises at least one planar-shaped end portion.

27. The electro-optical connection assembly of claim 23, wherein the ferrule comprises a gradient index (GRIN) lens holder, and the at least one optical interface is comprised of at least one GRIN lens disposed in the GRIN lens holder.

\* \* \* \* \*